US011934113B2

(12) United States Patent
Fukamachi et al.

(10) Patent No.: US 11,934,113 B2
(45) Date of Patent: Mar. 19, 2024

(54) DEVELOPING CARTRIDGE INCLUDING PROTRUSION POSITIONED AT OUTER SURFACE OF CASING

(71) Applicant: BROTHER KOGYO KABUSHIKI KAISHA, Nagoya (JP)

(72) Inventors: Yasuo Fukamachi, Nagoya (JP); Kazuna Taguchi, Nagoya (JP); Takuya Kanda, Nagoya (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 0 days.

(21) Appl. No.: 18/177,485

(22) Filed: Mar. 2, 2023

(65) Prior Publication Data

US 2023/0205115 A1 Jun. 29, 2023

Related U.S. Application Data

(63) Continuation of application No. 17/698,378, filed on Mar. 18, 2022, now Pat. No. 11,635,708, which is a (Continued)

(30) Foreign Application Priority Data

Feb. 6, 2015 (JP) ................................ 2015-022608

(51) Int. Cl.
*G03G 15/08* (2006.01)
*G03G 21/16* (2006.01)

(52) U.S. Cl.
CPC ..... *G03G 15/0889* (2013.01); *G03G 15/0891* (2013.01); *G03G 21/1647* (2013.01); *G03G 2221/1657* (2013.01)

(58) Field of Classification Search
CPC ........... G03G 15/0889; G03G 15/0891; G03G 21/1647; G03G 2221/1657;

(Continued)

(56) References Cited

U.S. PATENT DOCUMENTS 6,101,350 A 8/2000 Suzuki et al.
6,330,410 B1 12/2001 Okabe (Continued)

FOREIGN PATENT DOCUMENTS

CN 1591231 A 3/2005
CN 101358624 A 2/2009

(Continued)

OTHER PUBLICATIONS

Related U.S. Appl. No. 15/376,141, filed Dec. 12, 2016.

(Continued)

*Primary Examiner* — Sandra Brase
(74) *Attorney, Agent, or Firm* — Merchant & Gould P.C.

(57) ABSTRACT

A developing cartridge may include: a casing; a developing roller extending in a first direction; a developing-roller gear; a coupling including a coupling gear; a first idle gear; a second idle gear; an agitator; a first agitator gear; and a protrusion. The developing-roller gear, the coupling, the first idle gear, the second idle gear, the first agitator gear, and the protrusion may be positioned at an outer surface of the casing. The protrusion may be positioned between a first axis of the coupling and a third axis of the first agitator gear in a second direction connecting the first and third axes. The protrusion may be positioned outside an addendum circle of the developing-roller gear, an addendum circle of the coupling gear, an addendum circle of the first idle gear, and an addendum circle of the second idle gear. The first agitator gear may be spaced apart from the protrusion in the first direction.

16 Claims, 24 Drawing Sheets

Related U.S. Application Data continuation of application No. 17/178,377, filed on Feb. 18, 2021, now Pat. No. 11,327,418, which is a continuation of application No. 16/745,632, filed on Jan. 17, 2020, now Pat. No. 10,928,750, which is a continuation of application No. 16/239,708, filed on Jan. 4, 2019, now Pat. No. 10,551,768, which is a continuation of application No. 15/845,210, filed on Dec. 18, 2017, now Pat. No. 10,222,724, which is a continuation of application No. 15/380,544, filed on Dec. 15, 2016, now Pat. No. 9,857,731, which is a continuation of application No. PCT/JP2015/004440, filed on Sep. 1, 2015.

(58) Field of Classification Search
CPC .......... G03G 21/1817; G03G 21/1821; G03G 21/1857; G03G 21/186; G03G 2221/1853
See application file for complete search history.

(56) References Cited

U.S. PATENT DOCUMENTS

| | | | |
|---|---|---|---|
| 9,857,731 | B2 | 1/2018 | Fukamachi et al. |
| 10,551,768 | B2 | 2/2020 | Fukamachi et al. |
| 10,928,750 | B2 | 2/2021 | Fukamachi et al. |
| 2001/0026707 | A1 | 10/2001 | Miyabe et al. |
| 2007/0009282 | A1 | 1/2007 | Sato et al. |
| 2007/0071481 | A1 | 3/2007 | Kamimura |
| 2007/0122165 | A1 | 5/2007 | Igarashi |
| 2007/0140725 | A1 | 6/2007 | Kamimura |
| 2008/0205911 | A1 | 8/2008 | Ishikawa et al. |
| 2009/0036221 | A1 | 2/2009 | Morimoto |
| 2010/0142995 | A1 | 6/2010 | Shiraki et al. |
| 2011/0158704 | A1 | 6/2011 | Takagi et al. |
| 2011/0236066 | A1 | 9/2011 | Takagi |
| 2011/0243578 | A1 | 10/2011 | Ukai et al. |
| 2012/0051795 | A1* | 3/2012 | Mushika ........... G03G 15/0855 399/262 |
| 2012/0057899 | A1 | 3/2012 | Asanuma et al. |
| 2012/0243882 | A1 | 9/2012 | Carot |
| 2013/0051851 | A1 | 2/2013 | Fukamachi |
| 2013/0058675 | A1 | 3/2013 | Anan et al. |
| 2013/0170845 | A1 | 7/2013 | Itabashi |
| 2014/0086613 | A1 | 3/2014 | Itabashi et al. |
| 2015/0003844 | A1 | 1/2015 | Ukai et al. |
| 2015/0003868 | A1 | 1/2015 | Shimizu et al. |
| 2015/0005134 | A1 | 1/2015 | Shimizu |
| 2015/0117906 | A1 | 4/2015 | Mori |
| 2017/0261915 | A1 | 9/2017 | Abe et al. |

FOREIGN PATENT DOCUMENTS

| | | | |
|---|---|---|---|
| CN | 201222169 | Y | 4/2009 |
| CN | 102200726 | A | 9/2011 |
| CN | 103186075 | A | 7/2013 |
| CN | 104252119 | A | 12/2014 |
| CN | 104471490 | A | 3/2015 |
| EP | 1 031 891 | A1 | 8/2006 |
| EP | 1 696 278 | A2 | 8/2006 |
| EP | 2 423 760 | A2 | 2/2012 |
| EP | 2 610 684 | A2 | 7/2013 |
| JP | 2006-251269 | A | 9/2006 |
| JP | 2009-181027 | A | 8/2009 |
| JP | 2010-009075 | A | 1/2010 |
| JP | 2011-065181 | A | 3/2011 |
| JP | 2011-133763 | A | 7/2011 |
| JP | 2011-215374 | A | 10/2011 |
| JP | 2013-033266 | A | 2/2013 |
| JP | 2013-50493 | A | 3/2013 |
| JP | 2013-054216 | A | 3/2013 |
| JP | 2013-137429 | A | 7/2013 |
| JP | 2015-011231 | A | 1/2015 |
| JP | 2015-129813 | A | 7/2015 |
| JP | 2016-145906 | A | 8/2016 |
| WO | 2016/125209 | A | 8/2016 |
| WO | 2017/057489 | A1 | 4/2017 |

OTHER PUBLICATIONS

International Search Report and Written Opinion issued in related international application PCT/JP2015/004440, dated Oct. 13, 2015.
International Search Report and Written Opinion from corresponding International Application No. PCT/JP2016/086698, dated Mar. 7, 2017.
International Search Report and Written Opinion from corresponding International Application No. PCT/JP2016/078673, dated Dec. 27, 2016.
Extended European Search Report issued in related European application No. EP 15 88 1026.7, dated May 18, 2017.
English translation of International Search Report and Written Opinion from corresponding International Application No. PCT/JP2016/086698, dated Mar. 7, 2017.
International Preliminary Examination Report on Patentability issued in related International Patent Application No. PCT/JP2015/004440 dated Aug. 17, 2017.
International Preliminary Report on Patentability issued in related International Patent Application No. PCT/JP2016/078673 dated Apr. 3, 2018.
Office Action issued in related European Patent Application No. 15 881 026.7, dated Jun. 3, 2019.
Office Action issued in related Japanese Patent Application No. 2015-194011, dated Oct. 8, 2019.
Office Action issued in related Chinese Patent Application No. 201580041648.6, dated Dec. 3, 2019.
Office Action issued in corresponding German Patent Application No. 112015002956.7, dated Feb. 5, 2020.
Office Action issued in related Chinese Patent Application No. 201680083241.4, dated May 18, 2020.
Notification of Second Office Action issued in corresponding Chinese Patent Application No. 201580041648.6, dated Jun. 23, 2020.
Extended European Search Report issued in corresponding European Patent Application No. 20180563.7, dated Oct. 9, 2020.
Extended European Search Report issued in corresponding application 23189741.2, dated Oct. 24, 2023.
Office Action issued in corresponding Chinese Patent Application No. 202011542146.0, dated Nov. 13, 2023.

* cited by examiner

DEVELOPING CARTRIDGE INCLUDING PROTRUSION POSITIONED AT OUTER SURFACE OF CASING

CROSS REFERENCE TO RELATED APPLICATION

This application is a continuation of U.S. patent application Ser. No. 17/698,378, filed Mar. 18, 2022, which is a continuation of U.S. patent application Ser. No. 17/178,377, filed Feb. 18, 2021, which is a continuation of U.S. patent application Ser. No. 16/745,632, filed Jan. 17, 2020, now U.S. Pat. No. 10,928,750, which is a continuation of U.S. patent application Ser. No. 16/239,708, filed on Jan. 4, 2019, now U.S. Pat. No. 10,551,768, which is a continuation of U.S. patent application Ser. No. 15/845,210, filed Dec. 18, 2017, now U.S. Pat. No. 10,222,724, issued in Mar. 5, 2019, which is a continuation of U.S. patent application Ser. No. 15/380,544, filed on Dec. 15, 2016, now U.S. Pat. No. 9,857,731, issued on Jan. 2, 2018, which a continuation of International Application No. PCT/JP2015/004440 filed Sep. 1, 2015 in Japan Patent Office as a Receiving Office, which claims priority from Japanese Patent Application No. 2015-022608 filed Feb. 6, 2015. The entire contents of all applications are incorporated herein by reference

TECHNICAL FIELD

The present disclosure relates to a developing cartridge.

BACKGROUND

A developing cartridge that can be mounted in a drum cartridge is well known in the art. One such drum cartridge includes a photosensitive drum.

The developing cartridge has a rib positioned at a side surface of the developing cartridge. When the developing cartridge is mounted to the drum cartridge, the rib is pressed by a pivot arm provided at the drum cartridge. Through this operation, a developing roller provided at the developing cartridge is pressed toward the photosensitive drum of the drum cartridge.

SUMMARY

In the conventional developing cartridge described above, a coupling is meshed with an idle gear, and the idle gear is meshed with an agitator gear. In some cases, the rib has been provided at a position closer to the developing roller than the position described in the prior art.

In this case described above, because the rib may come into contact with a gear (e.g., the idle gear or the agitator gear) positioned at the side surfaces of the developing cartridge, the rib may interfere with rotation of the gear, for example.

In view of the foregoing, it is an object of the disclosure to provide a developing cartridge that enables a coupling, an idle gear, and an agitator gear to rotate even when a rib is provided at a position near a developing roller.

In order to attain above and other object, according to one aspect, the disclosure may provide a developing cartridge including: a casing; a developing roller; a developing-roller gear; a coupling; a first idle gear; a second idle gear; an agitator; a first agitator gear; and a protrusion. The casing may be configured to accommodate a developer therein. The developing roller may extend in a first direction. The developing-roller gear may be mounted to the developing roller and rotatable with the developing roller. The developing-roller gear may be positioned at an outer surface of the casing. The coupling may be rotatable about a first axis extending in the first direction and positioned at the outer surface. The coupling may include a coupling gear meshing with the developing-roller gear. The coupling gear may be rotatable with the coupling. The first idle gear may mesh with the coupling gear and is rotatable about a second axis extending in the first direction. The first idle gear may be positioned at the outer surface. The second idle gear may be rotatable with the first idle gear about the second axis. The second idle gear may be positioned at the outer surface and spaced apart farther from the outer surface than the first idle gear from the outer surface. A diameter of the second idle gear may be smaller than a diameter of the first idle gear. The agitator may extend in the first direction. The first agitator gear may be mounted to the agitator and rotatable with the agitator about a third axis extending in the first direction. The first agitator gear may be positioned at the outer surface and may mesh with the second idle gear. The protrusion may extend in the first direction. The protrusion may be positioned between the first axis and the third axis in a second direction connecting the first axis and the third axis and positioned at the outer surface. The protrusion may be positioned outside an addendum circle of the developing-roller gear, outside an addendum circle of the coupling gear, outside an addendum circle of the first idle gear and outside an addendum circle of the second idle gear. The first agitator gear may be spaced apart from the protrusion in the first direction.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

First Embodiment

1. Overview of Developing Cartridge

Figure 1:
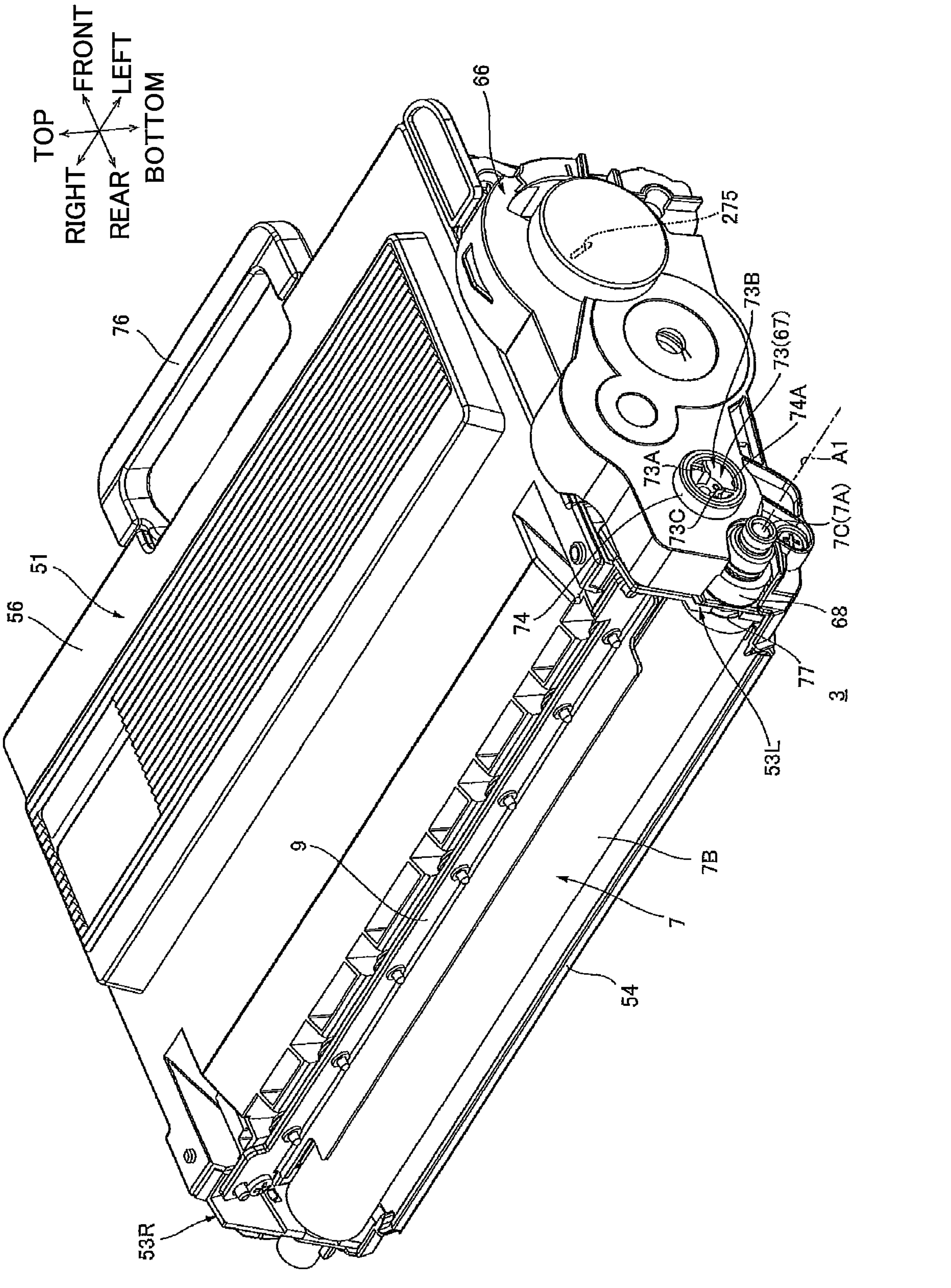
FIG. 1 is an example of a perspective view of a developing cartridge according to a first embodiment.

As shown in FIGS. 1, 2, 3, and 15, a developing cartridge 3 includes a casing 51, a supply roller 8, a developing roller 7, a thickness-regulating blade 9, a bearing 50, a gear train 65, and a gear cover 66. The developing roller 7 extends in a predetermined direction (an example of a first direction). In the first embodiment, the predetermined direction that the developing roller 7 extends is a left-right direction. When referring to the drawings, a top-bottom direction and a front-rear direction defined on the left-right direction will be used as indicated by arrows in FIG. 1.

<Toner-Accommodating Section 10>

Figure 6:
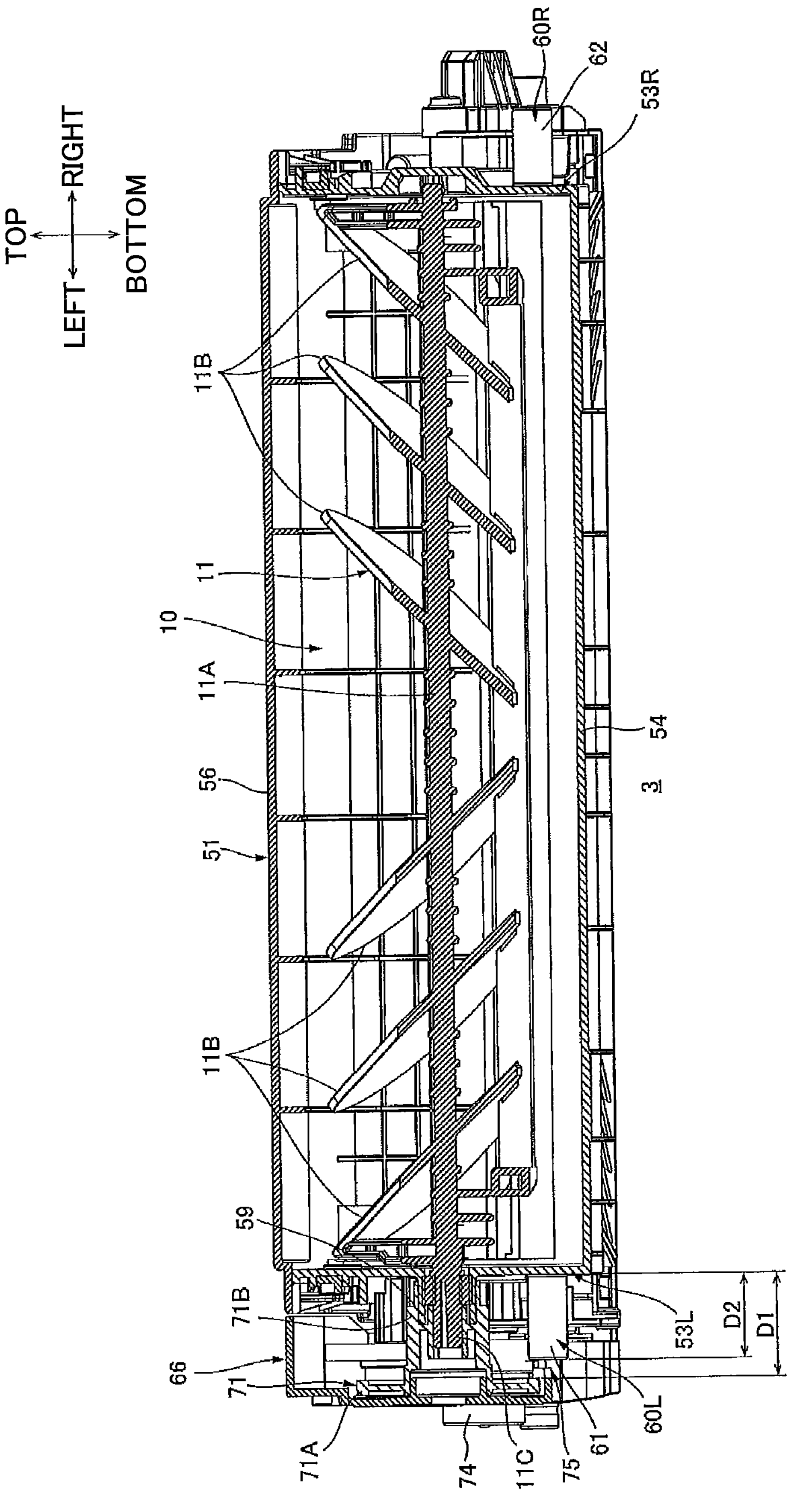
FIG. 6 is an example of a cross-sectional view taken along B-B in FIG. 5.

As shown in FIG. 6, a toner-accommodating section 10 is provided inside the developing cartridge 3. Specifically, the toner-accommodating section 10 is a space provided inside the casing 51. The toner-accommodating section 10 is configured to accommodate toner. Toner is an example of a developer.

<Agitator 11>

An agitator 11 is provided inside the casing 51. Specifically, the agitator 11 is provided in the toner-accommodating section 10. The agitator 11 is rotatably supported in the toner-accommodating section 10. The agitator 11 includes an agitator shaft 11A, and a blade 11B. The agitator 11 includes a plurality of the blades 11B in the first embodiment. The plurality of the blades 11B can agitate toner in the toner-accommodating section 10. The blade 11B may be made of resin. The blade 11B may be made of film.

The agitator shaft 11A has a columnar shape that extends in the left-right direction. That is, a center axis A2 of the agitator 11 extends in the left-right direction. The center axis A2 of the agitator 11 is an example of a third axis.

Each of the plurality of the blades 11B extends radially outward from an outer circumferential surface of the agitator shaft 11A. The plurality of the blades 11B are positioned inside the toner-accommodating section 10. The plurality of the blades 11B are positioned inside the toner-accommodating section 10 between a left wall 53L and a right wall 53R of the casing 51 described later. A portion of the agitator 11 at which the plurality of the blades 11B are provided is an example of an agitator main body.

<Supply Roller 8>

Figure 3:
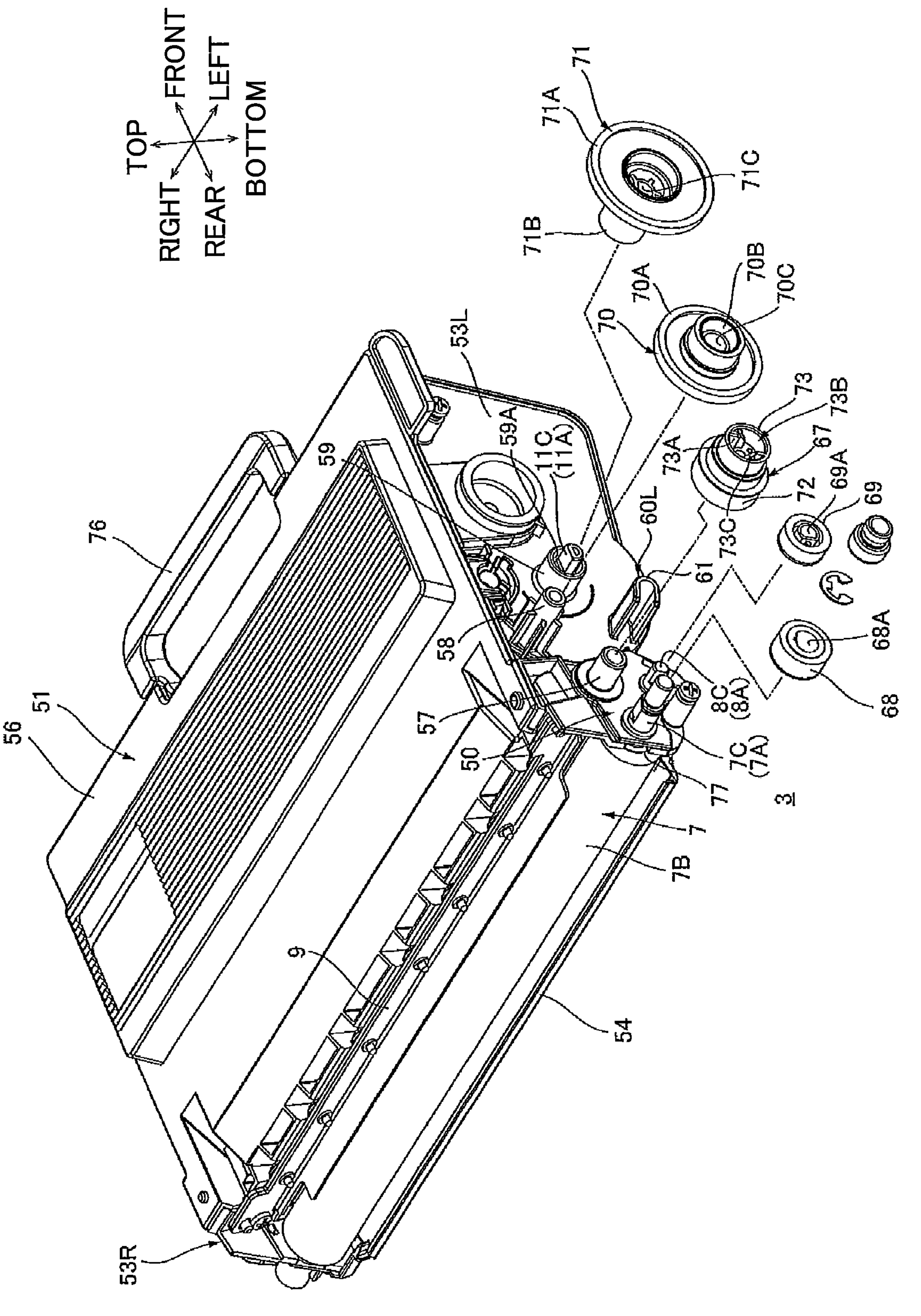
FIG. 3 is an example of an exploded perspective view of the developing cartridge in FIG. 2.
Figure 15:
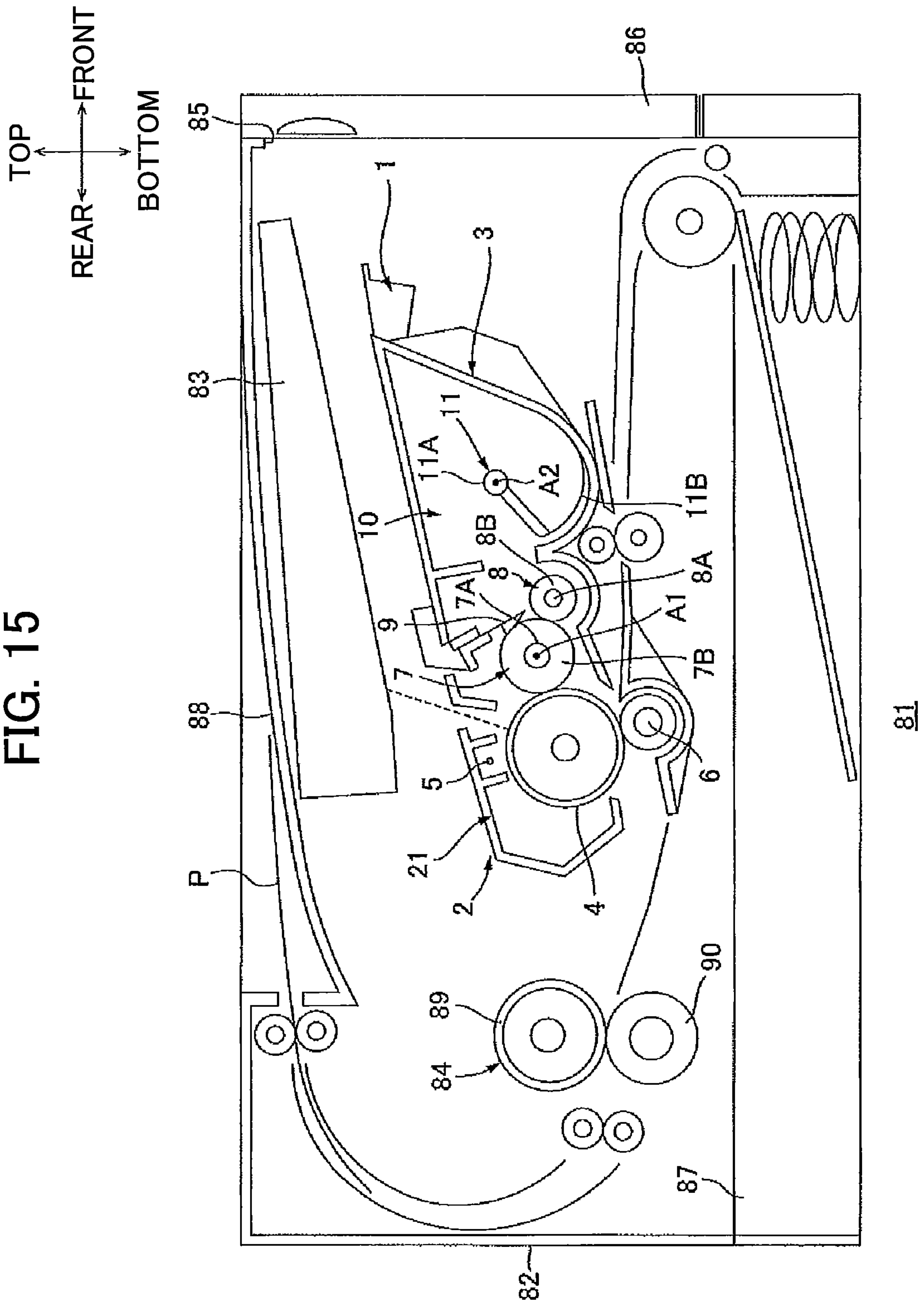
FIG. 15 is an example of a central cross-sectional view of an image forming apparatus in which the process cartridge of the first embodiment is mounted.

As shown in FIGS. 3 and 15, the supply roller 8 is a roller for supplying toner from the toner-accommodating section 10 toward the developing roller 7. The supply roller 8 includes a supply-roller shaft 8A, and a supply-roller main body 8B.

The supply-roller shaft 8A has a columnar shape. The supply-roller shaft 8A is made of metal. The supply-roller shaft 8A extends in the left-right direction.

The supply-roller main body 8B has a cylindrical shape. The supply-roller main body 8B extends in the left-right direction. The supply-roller main body 8B is made of an electrically-conductive sponge material, for example. The supply-roller main body 8B covers a center region of the supply-roller shaft 8A in the left-right direction. In the first embodiment, the supply-roller main body 8B does not cover left and right end portions of the supply-roller shaft 8A. In other words, in the first embodiment, the supply-roller shaft 8A penetrates the supply-roller main body 8B in the left-right direction. The supply-roller main body 8B is positioned between the left wall 53L and the right wall 53R of the casing 51 in the left-right direction described later. A surface of the supply-roller main body 8B contacts a surface of a developing-roller main body 7B.

While the supply-roller shaft 8A penetrates the supply-roller main body 8B in the left-right direction in the first embodiment, the supply-roller shaft 8A may extend in the left-right direction from each of left and right ends of the supply-roller main body 8B.

<Developing Roller 7>

As shown in FIG. 1, the developing roller 7 includes a developing-roller shaft 7A, and the developing-roller main body 7B.

The developing-roller shaft 7A has a columnar shape. The developing-roller shaft 7A is made of metal. The developing-roller shaft 7A extends in the left-right direction. That is, a center axis A1 of the developing roller 7 extends in the left-right direction.

The developing-roller main body 7B has a cylindrical shape. The developing-roller main body 7B extends in the left-right direction. The developing-roller main body 7B is made of an electrically-conductive rubber, for example. The developing-roller main body 7B covers a center region of the developing-roller shaft 7A in the left-right direction. In the first embodiment, the developing-roller main body 7B does not cover left and right end portions of the developing-roller shaft 7A. In other words, in the first embodiment, the developing-roller shaft 7A penetrates the developing-roller main body 7B in the left-right direction. The developing-roller main body 7B is positioned between the left wall 53L and the right wall 53R of the casing 51 in the left-right direction described later.

While the developing-roller shaft 7A penetrates the developing-roller main body 7B in the left-right direction in the first embodiment, the developing-roller shaft 7A may extend in the left-right direction from each of left and right ends of the developing-roller main body 7B.

<Thickness-Regulating Blade 9>

The thickness-regulating blade 9 is positioned at the upper-front side of the developing roller 7. The thickness-regulating blade 9 contacts a surface of the developing-roller main body 7B.

2. Casing

The casing 51 has a box-like shape. The casing 51 includes the left wall 53L, the right wall 53R, a bottom wall 54, a front wall 55, and a top wall 56. The toner-accommodating section 10 (see FIG. 6) is a space defined by the left wall 53L, the right wall 53R, the bottom wall 54, the front wall 55, and the top wall 56. In the first embodiment, a side of the casing 51 in which the toner-accommodating section 10 is provided is defined as an inside of the casing 51, and a side of the casing 51 opposite the toner-accommodating section 10 is defined as an outside of the casing 51. A surface of the casing 51 is an example of an outer surface.

<Left Wall 53L>

As shown in FIGS. 1 and 3, the left wall 53L is positioned at one end of the developing roller 7 in the left-right direction. Specifically, the left wall 53L is positioned at one end of the developing-roller main body 7B in the left-right direction. The left wall 53L is positioned at a left end of the casing 51. The left wall 53L has a plate shape that extends in the front-rear and top-bottom directions. The left wall 53L has an insertion hole 77, an agitator-gear shaft 59, an idle-gear shaft 58, and a protrusion 60L. An outer surface of the left wall 53L is an example of an outer surface.

<Insertion Hole 77>

A left end portion 7C of the developing-roller shaft 7A is inserted through the insertion hole 77. Specifically, the left end portion 7C of the developing-roller shaft 7A is inserted through the insertion hole 77 in a state where the developing-roller shaft 7A is attached to the bearing 50 described later. At this time, the bearing 50 is attached to the outer surface of the left wall 53L. The insertion hole 77 is positioned at a rear end portion of the left wall 53L. The insertion hole 77 penetrates the left wall 53L in the left-right direction. Further, the insertion hole 77 is cut out rearward from a rear edge of the left wall 53L.

<Agitator-Gear Shaft 59>

The agitator-gear shaft 59 is positioned at the surface of the casing 51. Specifically, the agitator-gear shaft 59 extends outward from the surface of the casing 51 and the agitator-gear shaft has a cylindrical shape. The agitator-gear shaft 59 is positioned at the outer surface of the left wall 53L. The agitator-gear shaft 59 extends in the left-right direction from the outer surface of the left wall 53L. A through-hole 59A extending in the left-right direction is formed inside the agitator-gear shaft 59. More specifically, the through-hole 59A penetrates an interior of the agitator-gear shaft 59 in the left-right direction. A left end portion 11C of the agitator shaft 11A is inserted through the through-hole 59A and is exposed on the outer surface of the left wall 53L. An agitator gear 71 described later is mounted to the exposed left end portion 11C of the agitator shaft 11A.

<Idle-Gear Shaft 58>

The idle-gear shaft 58 is positioned at the surface of the casing 51. Specifically, the idle-gear shaft 58 extends outward from the surface of the casing 51 and has a cylindrical shape. The idle-gear shaft 58 is positioned at the outer surface of the left wall 53L. The idle-gear shaft 58 extends leftward from the outer surface of the left wall 53L and has a cylindrical shape. That is, a center axis A4 of the idle-gear shaft 58 extends in the left-right direction. The idle-gear shaft 58 is positioned between the bearing 50 and the agitator-gear shaft 59 in the front-rear direction. The center axis A4 of the idle-gear shaft 58 is an example of a second axis.

<Position of Protrusion 60L>

Figure 5:
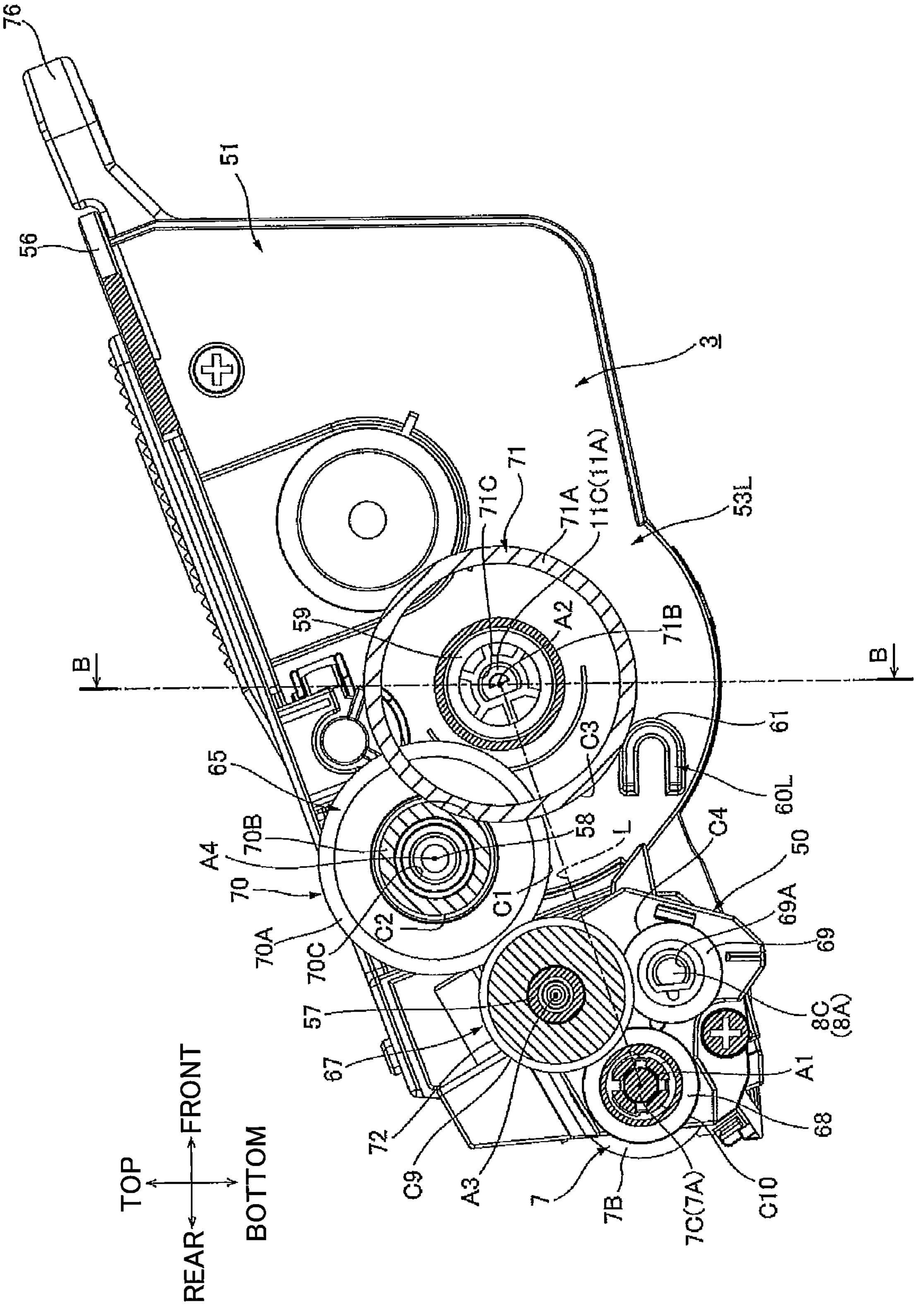
FIG. 5 is an example of a cross-sectional view taken along A-A in FIG. 4, in which the gear cover is omitted.

The protrusion 60L is positioned at the surface of the casing 51. Specifically, the protrusion 60L extends outward from the surface of the casing 51. The protrusion 60L is positioned at the outer surface of the left wall 53L. The protrusion 60L extends leftward from the outer surface of the left wall 53L. The protrusion 60L is positioned at the opposite side of the agitator-gear shaft 59 from the idle-gear shaft 58 in the top-bottom direction. Further, as shown in FIG. 5, the protrusion 60L is positioned at the opposite side of an imaginary plane L passing through the center axis A1 of the developing-roller shaft 7A and the center axis A2 of the agitator shaft 11A from the idle-gear shaft 58. In the first embodiment, the protrusion 60L extends from the outer surface of the left wall 53L, but is not limited to this configuration. For example, the protrusion 60L may be attached as a separate member to the outer surface of the left wall 53L. Alternatively, the protrusion 60L may be attached to the outer surface of the left wall 53L via another member. The protrusion 60L may be fixed to the left wall 53L.

<Shape of Protrusion 60L>

The protrusion 60L has a U-shape when viewed in the left-right direction. The protrusion 60L has a shape allowing a pressing force to be received. Specifically, the protrusion 60L has a surface for receiving the pressing force. More specifically, the protrusion 60L has a curved surface 61. The curved surface 61 is curved in a direction from the developing roller 7 to the protrusion 60L. When a pressing member 26L described later contacts the curved surface 61, the curved surface 61 can receive suitably a pressing force from the pressing member 26L toward a photosensitive drum 4. The protrusion 60L is an example of a protrusion.

<Right Wall 53R>

Figure 7:
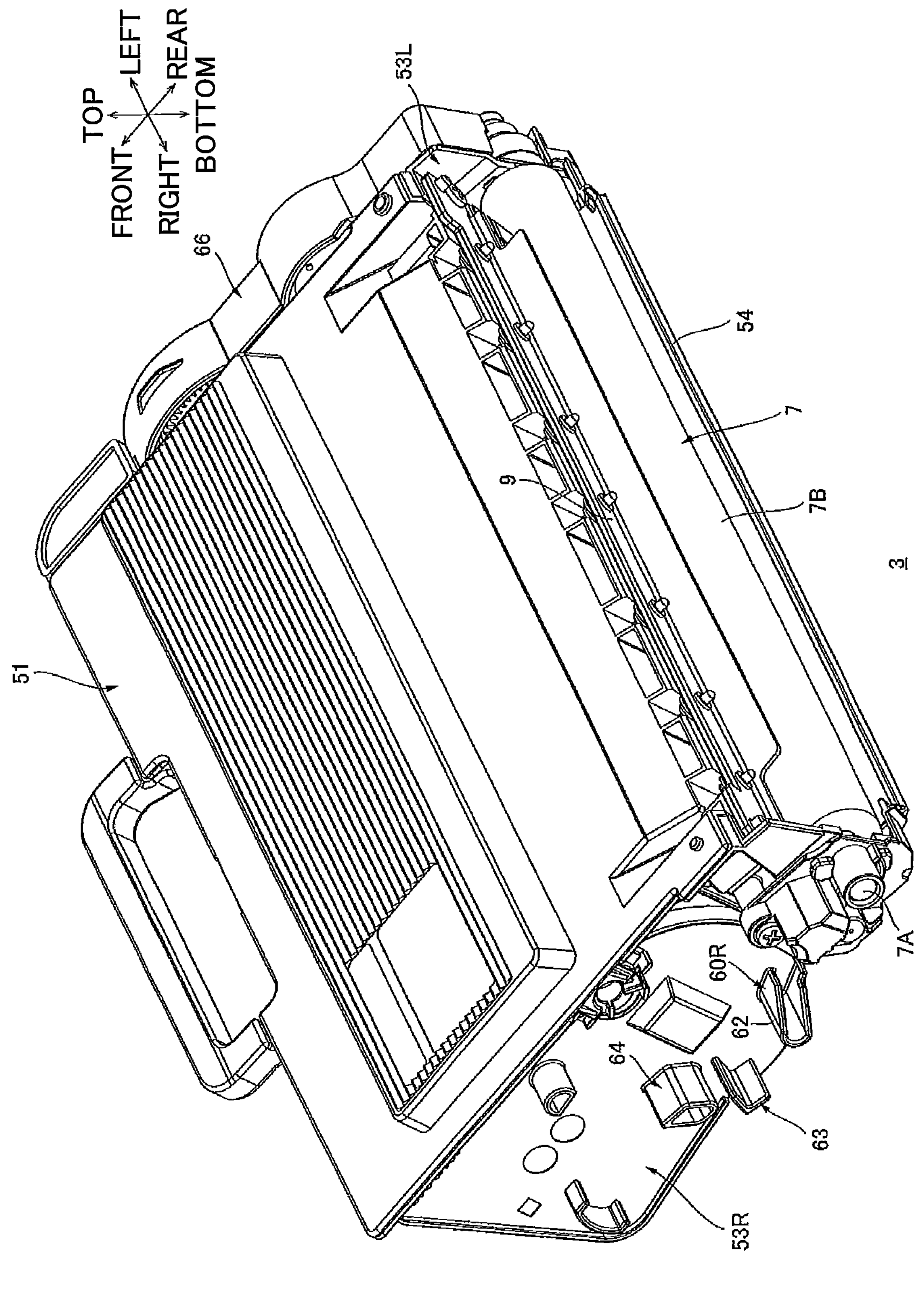
FIG. 7 is an example of a perspective view of the developing cartridge in FIG. 1 as viewed from the right.

As shown in FIG. 7, the right wall 53R is positioned at the other end of the developing roller 7 in the left-right direction. The other end of the developing roller 7 is separated from the one end in the left-right direction. Specifically, the right wall 53R is positioned at the other end of the developing-roller main body 7B in the left-right direction. The right wall 53R is positioned at a right end of the casing 51. The right wall 53R has a plate shape that extends in the front-rear and top-bottom directions. The right wall 53R includes a protrusion 60R, a lifting protrusion 63, and a locking protrusion 64. An outer surface of the right wall 53R is an example of a second outer surface.

<Position of Protrusion 60R>

The protrusion 60R is positioned at the surface of the casing 51. Specifically, the protrusion 60R extends outward from the surface of the casing 51. The protrusion 60R is positioned at the outer surface of the right wall 53R. The protrusion 60R extends rightward from the outer surface of the right wall 53R. At least part of the protrusion 60R is positioned to be aligned with at least part of the protrusion 60L (see FIG. 3) in the left-right direction. In the first embodiment, the protrusion 60R extends from the outer surface of the right wall 53R, but is not limited to this configuration. For example, the protrusion 60R may be attached as a separate member to the outer surface of the right wall 53R. Alternatively, the protrusion 60R may be attached to the outer surface of the right wall 53R via another member. The right wall 53R may be fixed to the right wall 53R.

<Shape of Protrusion 60R>

The protrusion 60R has a U-shape when viewed in the left-right direction. The protrusion 60R has a shape allowing a pressing force to be received. Specifically, the protrusion 60R has a surface for receiving the pressing force. More specifically, the protrusion 60R has a curved surface 62. The curved surface 62 curves in a direction from the developing roller 7 to the protrusion 60R. The protrusion 60R is an example of a second protrusion. When a pressing member 26R described later contacts the curved surface 62, the curved surface 62 can receive suitably a pressing force from the pressing member 26R toward the photosensitive drum 4.

<Lifting Protrusion 63>

The lifting protrusion 63 is positioned between a front end portion of the right wall 53R and the protrusion 60R in the front-rear direction. The lifting protrusion 63 is positioned at the outer surface of the right wall 53R. More specifically, the lifting protrusion 63 is a protrusion that extends rightward from the outer surface of the right wall 53R and has an L-shape when viewed in the left-right direction.

<Locking Protrusion 64>

The locking protrusion 64 is positioned between the front end portion of the right wall 53R and the protrusion 60R in the front-rear direction. The locking protrusion 64 is positioned at the outer surface of the right wall 53R. More specifically, the locking protrusion 64 is a protrusion that extends rightward from the outer surface of the right wall 53R and has a square cylindrical shape.

<Bottom Wall 54>

Figure 4:
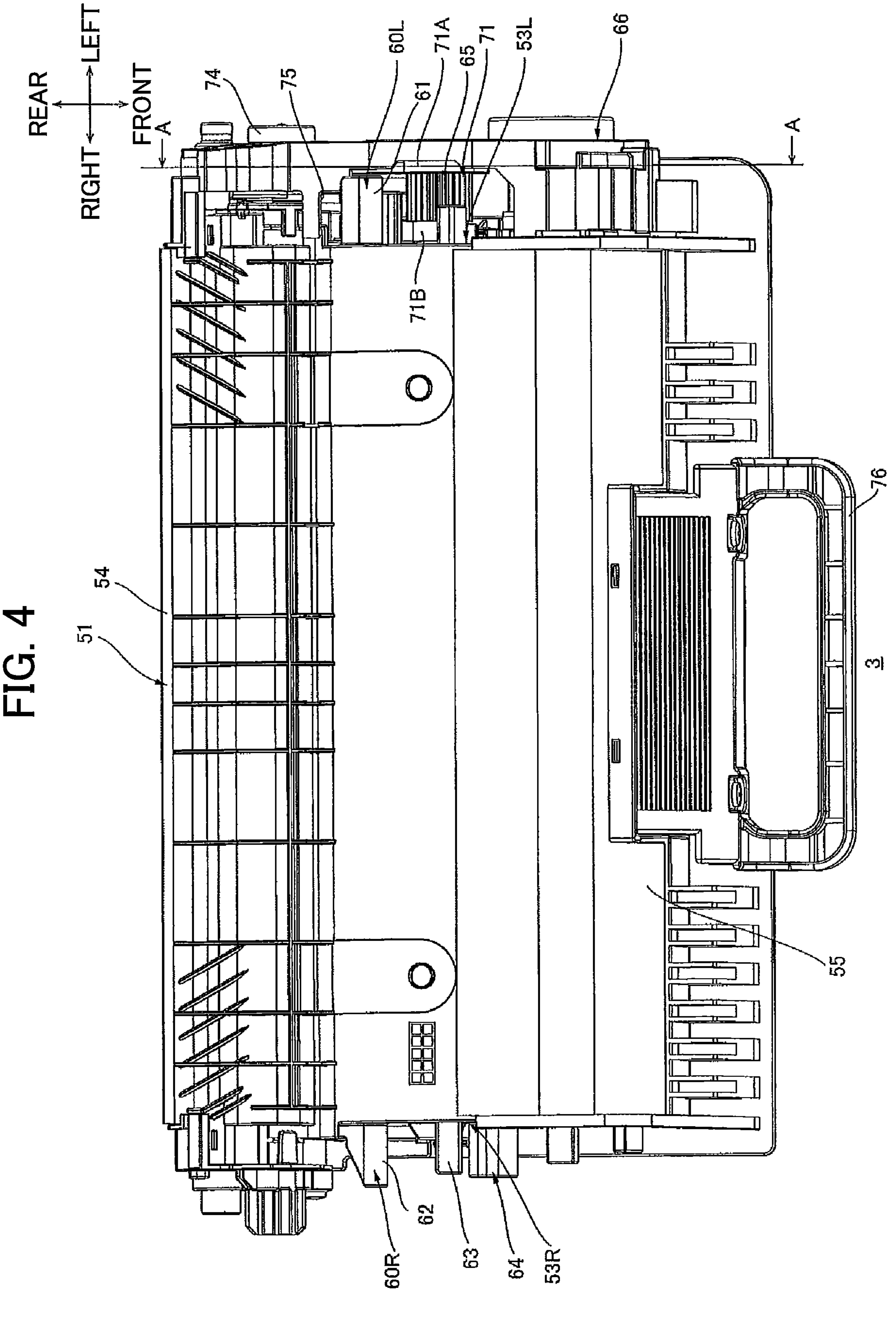
FIG. 4 is an example of a bottom view of the developing cartridge in FIG. 1.
Figure 8:
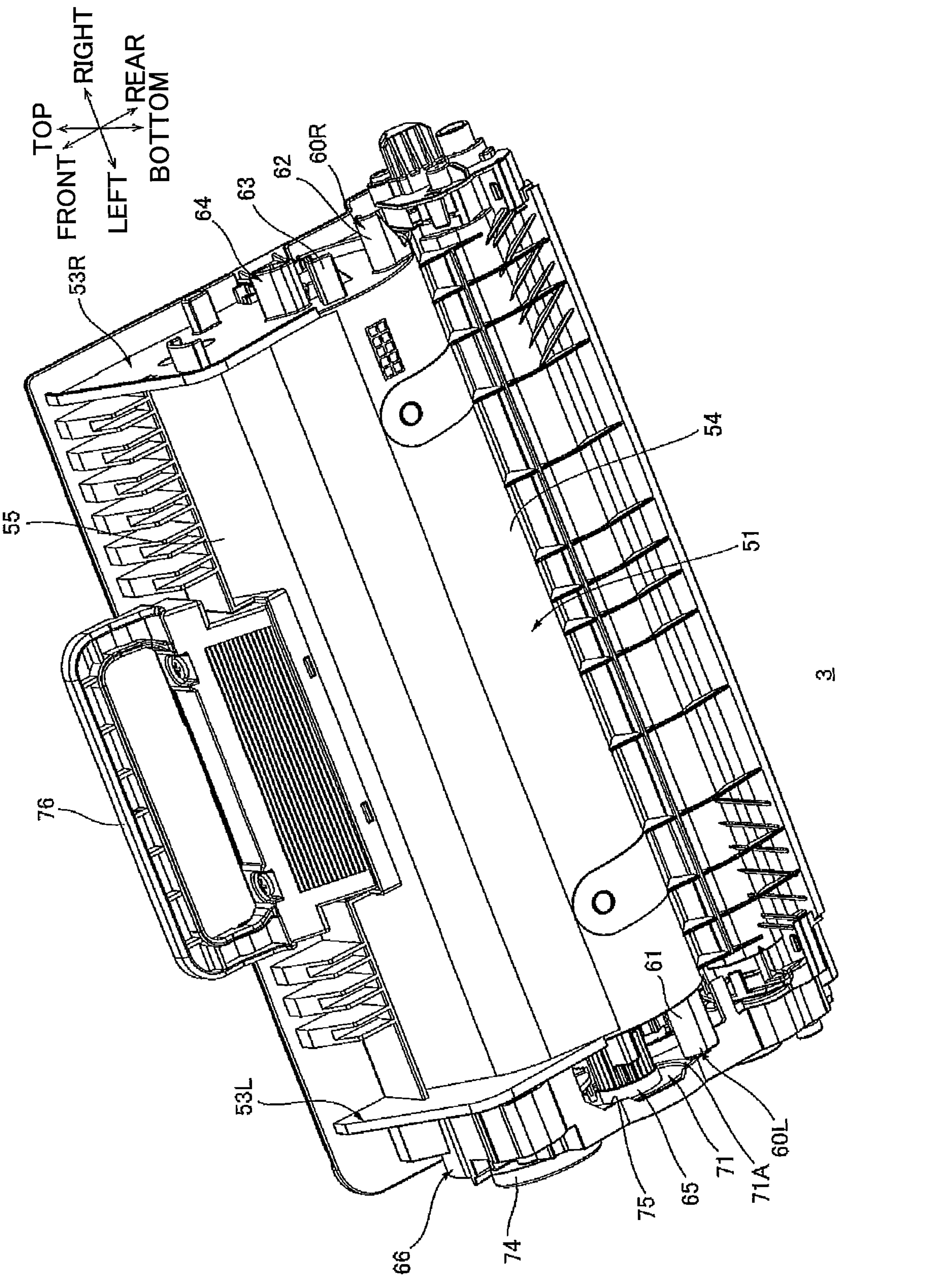
FIG. 8 is an example of a perspective view of the developing cartridge in FIG. 1 as viewed from below.

As shown in FIGS. 4 and 8, the bottom wall 54 has a plate shape that extends in the front-rear direction. The bottom wall 54 extends from the left wall 53L and the right wall 53R respectively.

<Front Wall 55>

The front wall 55 extends upward from a front edge of the bottom wall 54. The front wall 55 has a plate shape. The front wall 55 extends from the left wall 53L and the right wall 53R respectively. A developing-cartridge handle 76 is provided at the front wall 55.

The developing-cartridge handle 76 is positioned at a center region of a front edge of the front wall 55 in the left-right direction. The developing-cartridge handle 76 protrudes forward from the front edge of the front wall 55.

<Top Wall 56>

As shown in FIG. 3, the top wall 56 has a rectangular plate shape. A front edge of the top wall 56 is fixed to a top edge of the front wall 55. A left edge of the top wall 56 is fixed to a top edge of the left wall 53L. A right edge of the top wall 56 is fixed to a top edge of the right wall 53R.

<Bearing 50>

The bearing 50 is positioned at the outer surface of the left wall 53L. The bearing 50 is positioned at the left of the insertion hole 77 and is attached to the outer surface of the left wall 53L. The bearing 50 has a through-hole (not shown) through which the left end portion 7C of the developing-roller shaft 7A is inserted. The through-hole through which the left end portion 7C of the developing-roller shaft 7A is inserted is formed in a position aligned with the insertion hole 77 in the left-right direction. With this configuration, the bearing 50 can rotatably support the developing-roller shaft 7A. The bearing 50 has another through-hole (not shown) through which a left end portion 8C of the supply-roller shaft 8A is inserted. With this configuration, the bearing 50 rotatably supports the supply-roller shaft 8A. The bearing 50 includes a coupling shaft 57.

<Coupling Shaft 57>

The coupling shaft 57 is positioned between the developing-roller shaft 7A and the idle-gear shaft 58 in the front-rear direction. The coupling shaft 57 is positioned at the outer surface of the left wall 53L. The coupling shaft 57 extends leftward from a left surface of the bearing 50. The coupling shaft 57 has a cylindrical shape. That is, a center axis A3 of the coupling shaft 57 extends in the left-right direction. The center axis A3 of the coupling shaft 57 is an example of a first axis. While the coupling shaft 57 extends from the bearing 50 in the first embodiment, the coupling shaft 57 may be attached as a separate member to the bearing 50. Alternatively, the coupling shaft 57 may extend from the left wall 53L. In this case, the bearing 50 has a through-hole formed therein, and the coupling shaft 57 extends leftward through the through-hole of the bearing 50.

3. Gear Train

Figure 2:
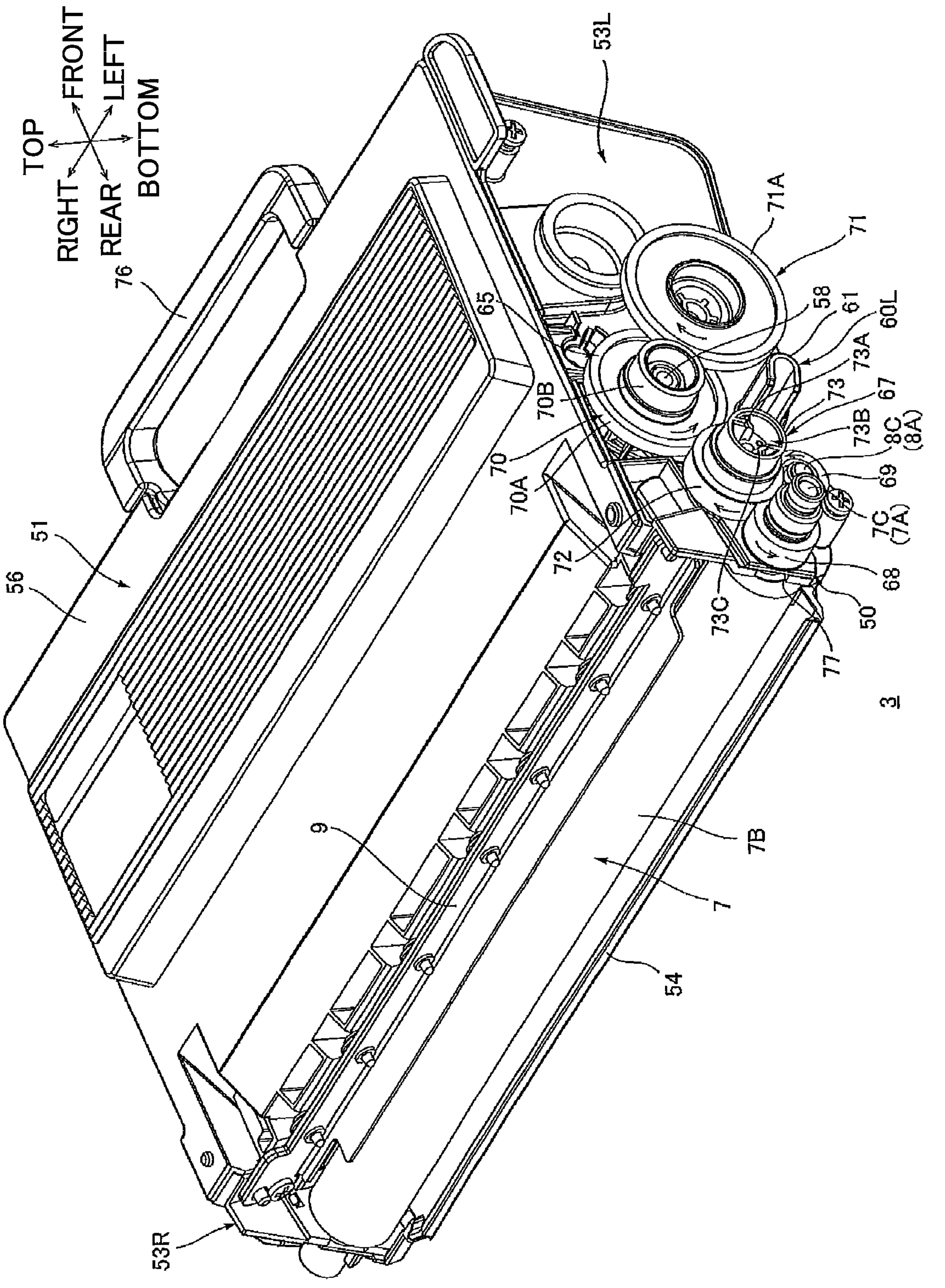
FIG. 2 is an example of a perspective view of the developing cartridge according to the first embodiment omitting a gear cover.

As shown in FIGS. 2, 3, and 5, the gear train 65 is positioned at the outer surface of the left wall 53L. The gear train 65 includes a developing coupling 67, a developing-roller gear 68, a supply-roller gear 69, an idle gear 70, and the agitator gear 71. The developing coupling 67 is an example of a coupling.

<Developing Coupling 67>

The developing coupling 67 has a columnar shape that extends in the left-right direction. The developing coupling 67 is rotatably supported at the coupling shaft 57. Specifically, the developing coupling 67 is mounted to the coupling shaft 57 and the developing coupling 67 is rotatable about the coupling shaft 57. In other words, the developing coupling 67 is rotatable about the center axis A3 of the coupling shaft 57. When the developing coupling 67 is mounted to the coupling shaft 57, the developing coupling 67 is disposed at the outer surface of the left wall 53L of the casing 51 via the bearing 50. The developing coupling 67 includes a gear part 72, and a coupling part 73. More specifically, the gear part 72 is positioned at one end portion of the developing coupling 67 in the left-right direction, and the coupling part 73 is positioned at the other end portion of the developing coupling 67 in the left-right direction. The one end portion of the developing coupling 67 is mounted to the coupling shaft 57.

<Gear Part 72>

The gear part 72 is positioned at a right end portion of the developing coupling 67. The gear part 72 is integrally formed with the developing coupling 67. The gear part 72 is rotatable together with the developing coupling 67. The gear part 72 has a plurality of gear teeth. The plurality of gear teeth are provided around a rotating circumference of the developing coupling 67. An addendum circle C9 of the gear part 72 is spaced apart from the protrusion 60L. In other words, the protrusion 60L is positioned outside the addendum circle C9 of the gear part 72. The gear part 72 is an example of a coupling gear.

<Coupling Part 73>

The coupling part 73 has a configuration for receiving a drive force from external to the developing cartridge 3. For example, when an image forming apparatus includes a drive input unit for inputting a drive force into the coupling part 73, the drive input unit engages with the coupling part 73 and then the coupling part 73 can receive the drive force. More specifically, the coupling part 73 is depressed relative to one end of the developing coupling 67. More specifically, the coupling part 73 has a circular-shaped depression in the one end of the developing coupling 67. In the following description, a space depressed relative to the one end of the developing coupling 67 will be referred to as a space 73B. The coupling part 73 has a contact part 73A, and a contact part 73C. Each of the contact part 73A and the contact part 73C is positioned in the circular-shaped depressed space 73B. Each of the contact part 73A and the contact part 73C is arranged spaced apart from each other in a radial direction of the space 73B. Each of the contact part 73A and the contact part 73C protrudes radially inward in the circular-shaped space 73B and has a rectangular shape. When the contact part 73A and the contact part 73C engage with the drive input unit of the image forming apparatus to receive a drive force, the developing coupling 67 can rotate about the coupling shaft 57.

<Developing-Roller Gear 68>

The developing-roller gear 68 is meshed with the gear part 72 of the developing coupling 67. The developing-roller gear 68 has a disc shape with a thickness in the left-right direction. The developing-roller gear 68 has a plurality of gear teeth formed around an outer circumference of the developing-roller gear 68. The developing-roller gear 68 is positioned at the left of the bearing 50 and is supported at the left end portion 7C of the developing-roller shaft 7A so as to be incapable of rotating relative to the developing-roller shaft 7A. More specifically, the left end portion 7C of the developing-roller shaft 7A penetrates the bearing 50 and the developing-roller gear 68 is mounted to the left end portion 7C of the developing-roller shaft 7A. The developing-roller gear 68 has a D-shaped through-hole 68A, for example, formed in a center region of the developing-roller gear 68. Further, a portion of a circumferential surface of the left end portion 7C is cut away to form a D-shape when viewed in the left-right direction. By inserting the D-shaped left end portion 7C into the through-hole 68A, the developing-roller gear 68 becomes incapable of rotating relative to the developing-roller shaft 7A. With this configuration, the developing-roller shaft 7A can rotate together with the developing-roller gear 68. When the developing-roller gear 68 is mounted to the left end portion 7C, the developing-roller gear 68 is positioned at the outer surface of the left wall 53L of the casing 51. An addendum circle C10 of the developing-roller gear 68 is spaced apart from the protrusion 60L. The protrusion 60L is positioned outside the addendum circle C10 of the developing-roller gear 68.

<Supply-Roller Gear 69>

The supply-roller gear 69 is positioned below the developing coupling 67. The supply-roller gear 69 is meshed with the gear part 72 of the developing coupling 67. The supply-roller gear 69 has a disc shape with a thickness in the left-right direction. The supply-roller gear 69 has a plurality of gear teeth formed around an outer circumference of the supply-roller gear. An addendum circle C4 of the supply-roller gear 69 is spaced apart from the protrusion 60L. In other words, the protrusion 60L is positioned outside the addendum circle C4 of the supply-roller gear 69. The supply-roller gear 69 is positioned at the left of the bearing 50 and is supported at the left end portion 8C of the supply-roller shaft 8A so as to be incapable of rotating relative to the supply-roller shaft 8A. More specifically, the left end portion 8C of the supply-roller shaft 8A penetrates the bearing 50 and the supply-roller gear 69 is mounted to the left end portion 8C of the supply-roller shaft 8A. The supply-roller gear 69 has a D-shaped through-hole 69A, for example, formed in a center region of the supply-roller gear 69. Further, a portion of a circumferential surface of the left end portion 8C is cut away to form a D-shape when viewed in the left-right direction. By inserting the D-shaped left end portion 8C into the through-hole 69A, the supply-roller gear 69 becomes incapable of rotating relative to the supply-roller shaft 8A. With this configuration, the supply-roller shaft 8A can rotate together with the supply-roller gear 69. When the supply-roller gear 69 is mounted to the left end portion 8C, the supply-roller gear 69 is positioned at the outer surface of the left wall 53L of the casing 51.

<Idle Gear 70>

The idle gear 70 is rotatably supported at the idle-gear shaft 58. Specifically, the idle gear 70 is rotatably mounted to the idle-gear shaft 58. The idle gear 70 is spaced apart from the protrusion 60L. The idle gear 70 is positioned above the imaginary plane L passing through the center axis A1 of the developing-roller shaft 7A and the center axis A2 of the agitator shaft 11A. The idle gear 70 has a circular-shaped through-hole 70C, for example, formed in a center region of the idle gear 70. By inserting the idle-gear shaft 58 through the through-hole 70C, the idle gear 70 is rotatable about the center axis A4 of the idle-gear shaft 58. When the idle gear 70 is mounted to the idle-gear shaft 58, the idle gear 70 is positioned at the outer surface of the left wall 53L of the casing 51. The idle gear 70 includes a large-diameter gear 70A, and a small-diameter gear 70B. The large-diameter gear 70A and the small-diameter gear 70B are integrally formed. Hence, the small-diameter gear 70B can rotate together with the large-diameter gear 70A. The small-diameter gear 70B is separated farther from the left wall 53L in the left-right direction than the large-diameter gear 70A from the left wall 53L.

<Large-Diameter Gear 70A>

The large-diameter gear 70A has a disc shape with a thickness in the left-right direction. The large-diameter gear 70A has a plurality of gear teeth formed around an outer circumference of the large-diameter gear 70A. An addendum circle C1 of the large-diameter gear 70A is spaced apart from the protrusion 60L. In other words, the protrusion 60L is positioned outside the addendum circle C1 of the large-diameter gear 70A in the front-rear direction. The large-diameter gear 70A is meshed with the gear part 72 of the developing coupling 67. The large-diameter gear 70A is an example of a first idle gear.

<Small-Diameter Gear 70B>

The small-diameter gear 70B has a disc shape with a thickness in the left-right direction. An outer diameter of the small-diameter gear 70B is smaller than an outer diameter of the large-diameter gear 70A. The small-diameter gear 70B has a plurality of gear teeth formed around an outer circumference of the small-diameter gear 70B. An addendum circle C2 of the small-diameter gear 70B is spaced apart from the protrusion 60L. In other words, the protrusion 60L is positioned outside the addendum circle C2 of the small-diameter gear 70B in the front-rear direction. The small-diameter gear 70B is an example of a second idle gear.

<Agitator Gear 71>

The agitator gear 71 is mounted to the left end portion 11C of the agitator shaft 11A. The agitator gear 71 is supported at the left end portion 11C of the agitator shaft 11A so as to be incapable of rotating relative to the agitator-gear shaft 59. The agitator gear 71 has a gear part 71A, and a cylindrical part 71B.

<Cylindrical Part 71B>

The cylindrical part 71B extends in the left-right direction. The cylindrical part 71B has a D-shaped through-hole 71C formed in a center region of the cylindrical part 71B. A portion of a circumferential surface on the left end portion 11C of the agitator shaft 11A is cut away to form a D shape when viewed in the left-right direction. By inserting the D-shaped left end portion 11C into the through-hole 71C, the agitator gear 71 becomes incapable of rotating relative to the agitator shaft 11A. With this configuration, the agitator gear 71 can rotate together with the agitator shaft 11A. When the agitator gear 71 is mounted to the left end portion 11C, the agitator gear 71 is positioned at the outer surface of the left wall 53L of the casing 51. The cylindrical part 71B is positioned diagonally above and forward of the protrusion 60L and the cylindrical part 71B is spaced apart from the protrusion 60L.

<Gear Part 71A>

The gear part 71A is provided at the left end of the cylindrical part 71B. The gear part 71A is meshed with the small-diameter gear 70B of the idle gear 70. An outer diameter of the gear part 71A is larger than an outer diameter of the cylindrical part 71B. The gear part 71A has a disc shape with a thickness in the left-right direction. The gear part 71A has a plurality of gear teeth formed around an outer circumference of the gear part 71A. The gear part 71A and the cylindrical part 71B are integrally formed. Hence, the gear part 71A rotates together with the rotation of the cylindrical part 71B.

<Relative Layout of Protrusion 60L and Gear Train 65>

As shown in FIG. 5, the protrusion 60L is positioned between the center axis A4 of the idle-gear shaft 58 and the center axis A2 of the agitator 11 in the front-rear direction. At least part of the protrusion 60L is positioned inside an addendum circle C3 of the gear part 71A in the front-rear direction. As shown in FIG. 6, an edge of the gear part 71A facing the left wall 53L is spaced apart from the protrusion 60L in the left-right direction. Specifically, the edge of the gear part 71A facing the left wall 53L is separated from the protrusion 60L in the left-right direction. The edge of the gear part 71A facing the left wall 53L is farther from the left wall 53L than the protrusion 60L from the left wall 53L. In the first embodiment, the left wall 53L is separated from the edge of the gear part 71A facing the left wall 53L by a distance D1. A length of the protrusion 60L extending from the left wall 53L is a length D2. The distance D1 is greater than the length D2. Hence, the protrusion 60L does not prevent the gear part 71A from rotating even though the protrusion 60L is positioned within the addendum circle C3 of the gear part 71A in the front-rear direction. The gear part 71A is an example of a first agitator gear.

4. Gear Cover

As shown in FIGS. 1 and 8, the gear cover 66 covers the gear train 65. The gear cover 66 may cover at least part of the gear train 65. The gear cover 66 is positioned at the outer surface of the left wall 53L. The gear cover 66 is supported at the outer surface of the left wall 53L. The gear cover 66 has a coupling collar 74, and an opening 75.

The coupling collar 74 has a cylindrical shape that extends in the left-right direction. The coupling collar 74 has a through-hole 74A that penetrates the gear cover 66 in the left-right direction. An inner diameter of the through-hole 74A is sized to fit the coupling part 73 of the developing coupling 67. The coupling part 73 of the developing coupling 67 is rotatably fitted into the through-hole 74A.

Figure 12:
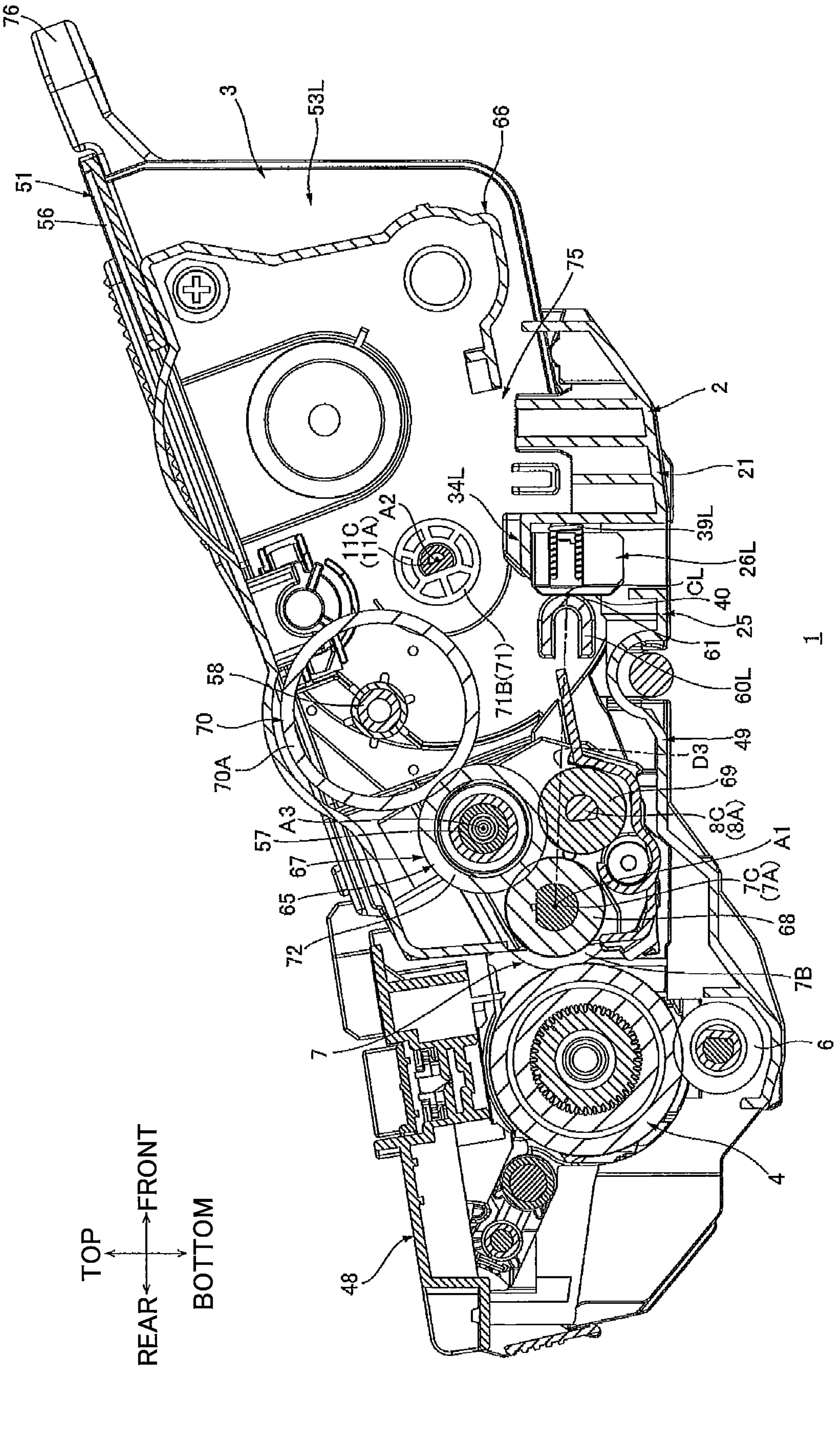
FIG. 12 is an example of a cross-sectional view taken along C-C in FIG. 11.

As shown in FIGS. 8 and 12, the opening 75 is positioned at the opposite side of the protrusion 60L from the idle gear 70 in the top-bottom direction when the gear cover 66 is mounted to the left wall 53L. A portion of the projection 60L is exposed outside the gear cover 66 through the opening 75. In other words, the gear cover 66 covers a portion of the protrusion 60L in the left-right direction.

5. Drum Cartridge

Figure 10:
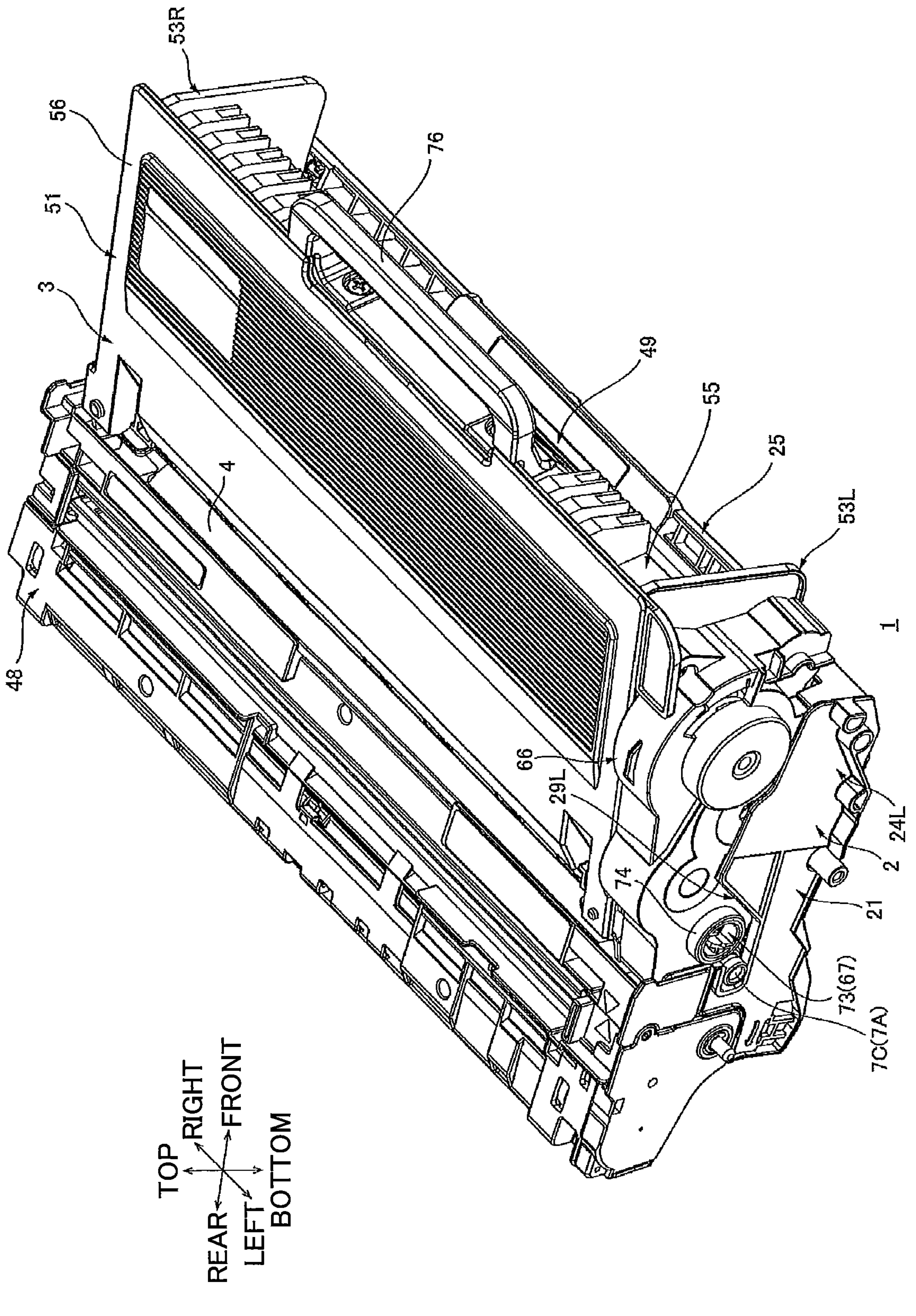
FIG. 10 is an example of a perspective view showing the developing cartridge of the first embodiment mounted to the drum cartridge.
Figure 11:
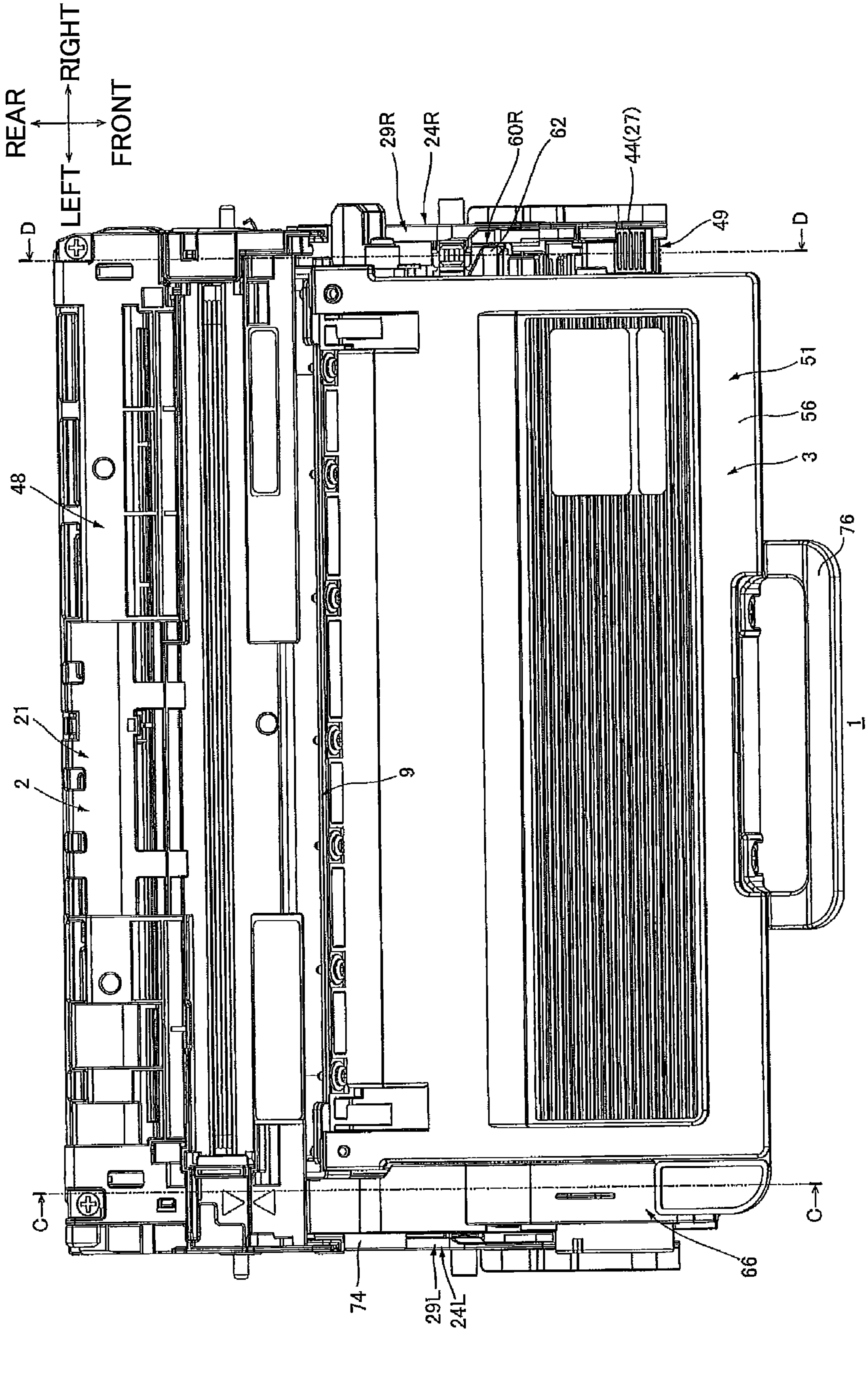
FIG. 11 is an example of a top plan view of a process cartridge shown in FIG. 10.

The developing cartridge 3 described above can be mounted to a drum cartridge 2. As shown in FIGS. 10 and 11, the developing cartridge 3 is mounted to the drum cartridge 2. In this state, the developing cartridge 3 and the drum cartridge 2 configure a process cartridge 1. Next, the state of the developing cartridge 3 mounted to the drum cartridge 2 will be described with reference to FIGS. 9 through 15.

(1) Overview of Drum Cartridge

Figure 9:
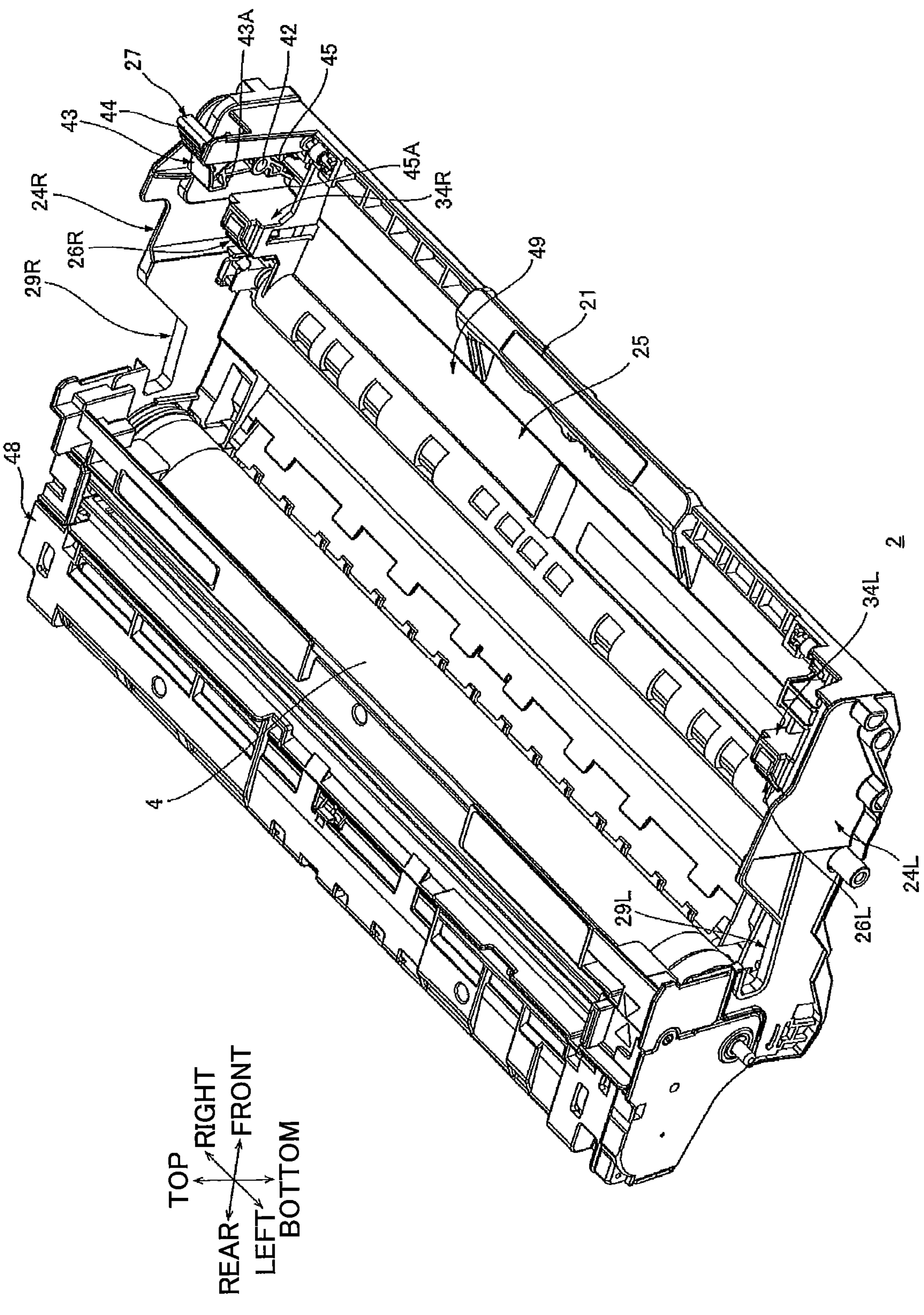
FIG. 9 is an example of a perspective view of a drum cartridge according to the first embodiment.

As shown in FIGS. 9 and 15, the drum cartridge 2 includes the photosensitive drum 4, a scorotron charger 5, a transfer roller 6, and a drum frame 21.

The photosensitive drum 4 has a cylindrical shape that extends in the left-right direction. The photosensitive drum 4 is rotatably supported at the drum frame 21.

The scorotron charger 5 applies an electric charge to a surface of the photosensitive drum 4. The scorotron charger 5 is positioned at one side relative to the photosensitive drum 4. The scorotron charger 5 is positioned spaced apart from the photosensitive drum 4.

The transfer roller 6 is a roller for transferring toner attached on the surface of the photosensitive drum 4 onto a sheet of paper. A surface of the transfer roller 6 contacts the surface of the photosensitive drum 4. The transfer roller 6 is positioned at the opposite side of the photosensitive drum 4 from the scorotron charger 5.

(2) Detailed Description of Drum Cartridge

<Drum Frame 21>

The drum frame 21 includes a support frame 48, and a mounting frame 49. The drum frame 21 will be described with reference to FIGS. 9 through 14.

<Support Frame 48>

The support frame 48 is shaped to support the photosensitive drum 4, the scorotron charger 5, and the transfer roller 6.

<Mounting Frame 49>

The mounting frame 49 includes a left wall 24L, a right wall 24R, and a bottom wall 25. The left wall 24L and the right wall 24R are separated from each other in the left-right direction. Each of the left wall 24L and the right wall 24R has a plate shape. The bottom wall 25 has a plate shape that extends in the left-right direction. The bottom wall 25 is connected to the left wall 24L and the right wall 24R.

<Pressing Members 26L and 26R>

The pressing member 26L and the pressing member 26R are provided at the mounting frame 49. The pressing member 26L and the pressing member 26R are positioned between the left wall 24L and the right wall 24R in the left-right direction. The pressing member 26L is positioned at one end portion of the bottom wall 25 in the left-right direction. The pressing member 26R is positioned at the other end portion of the bottom wall 25 in the left-right direction. The pressing member 26L and the pressing member 26R are arranged in the same position in the front-rear direction.

<Pressing Member 26L>

As shown in FIG. 12, the pressing member 26L includes a support member 34L, a compressed spring 39L, and a pressing surface 40.

The support member 34L is fixed to the mounting frame 49.

The compressed spring 39L is a spring for pressing the developing cartridge 3 toward the photosensitive drum 4. One end of the compressed spring 39L is attached to the support member 34L.

The pressing surface 40 has a planar shape that extends vertically. The pressing surface 40 is mounted at the other end of the compressed spring 39L.

The compressed spring 39L has a length L1 when the developing cartridge 3 is not mounted in the drum cartridge 2. When the developing cartridge 3 is not mounted to the drum cartridge 2, the compressed spring 39L urges the pressing surface 40 toward the photosensitive drum 4. When the developing cartridge 3 is mounted to the drum cartridge 2, the pressing surface 40 contacts the protrusion 60L and a length of the compressed spring 39L is shorter than the length L1. More specifically, when the developing cartridge 3 is mounted to the drum cartridge 2, the pressing surface 40 contacts the curved surface 61 of the protrusion 60L and a length of the compressed spring 39L is shorter than the length L1. Hereinafter, an area of contact between the pressing surface 40 and the protrusion 60L will be referred to as a contact area CL. Through this contact, the compressed spring 39L urges the pressing surface 40 to press the protrusion 60L toward the photosensitive drum 4.

<Pressing Member 26R>

Figure 13:
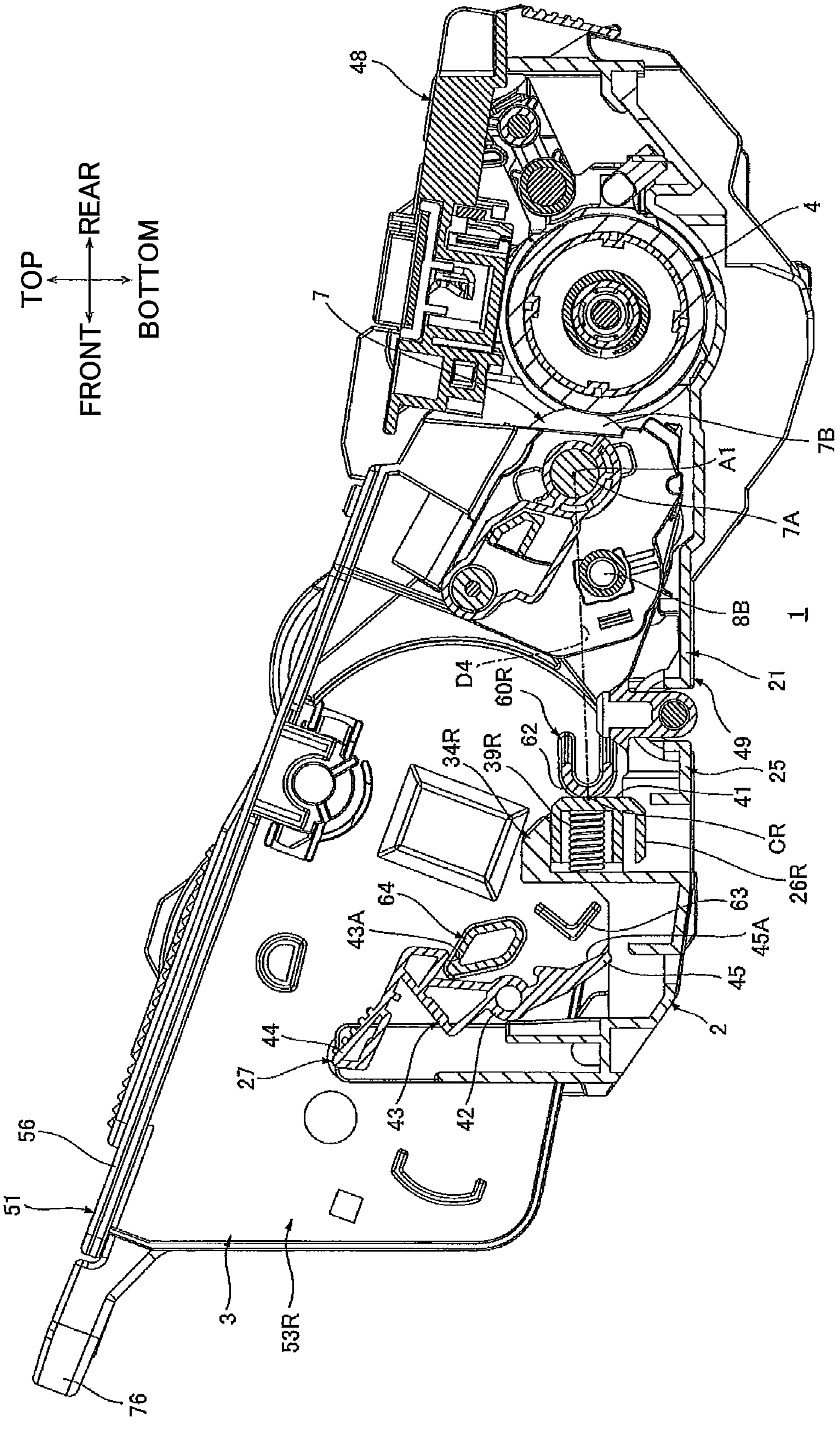
FIG. 13 is an example of a cross-sectional view taken along D-D in FIG. 11, in which a locking lever is in a lock position.

As shown in FIG. 13, the pressing member 26R includes a support member 34R, a compressed spring 39R, and a pressing surface 41.

The support member 34R is fixed to the mounting frame 49.

The compressed spring 39R is a spring for pressing the developing cartridge 3 toward the photosensitive drum 4. One end of the compressed spring 39R is attached to the support member 34R.

The pressing surface 41 has a planar shape that extends in the top-bottom direction. The pressing surface 41 is mounted to the other end of the compressed spring 39R.

The compressed spring 39R has a length L2 when the developing cartridge 3 is not mounted to the drum cartridge 2. When the developing cartridge 3 is not mounted to the drum cartridge 2, the compressed spring 39R urges the pressing surface 41 toward the photosensitive drum 4. When the developing cartridge 3 is mounted to the drum cartridge 2, the pressing surface 41 contacts the protrusion 60R, and a length of the compressed spring 39R is shorter than the length L2. More specifically, when the developing cartridge 3 is mounted to the drum cartridge 2, the pressing surface 41 contacts the curved surface 62 of the protrusion 60R and a length of the compressed spring 39R is shorter than the length L2. Hereinafter, an area of contact between the pressing surface 41 and the protrusion 60R will be referred to as a contact area CR. Through this contact, the compressed spring 39R urges the pressing surface 41 to press the protrusion 60R toward the photosensitive drum 4. Since the protrusion 60L and the protrusion 60R are in the same position when viewed in the left-right direction, a distance D3 (see FIG. 12) between the contact area CL and the center axis A1 of the developing-roller shaft 7A is equal to a distance D4 between the contact area CR and the center axis A1 of the developing-roller shaft 7A.

<Guide Surfaces 29L and 29R>

As shown in FIGS. 9 and 11, the left wall 24L has a guide surface 29L. Similarly, the right wall 24R has a guide surface 29R. Each of the guide surface 29L and the guide surface 29R guides the developing cartridge 3 when the developing cartridge 3 is mounted to the drum cartridge 2. In other words, each of the guide surface 29L and the guide surface 29R guides a surface of the developing roller 7 toward a surface of the photosensitive drum 4. The guide surface 29L and the guide surface 29R are arranged in the same position in the front-read direction. The developing cartridge 3 is guided by the guide surface 29L and the guide surface 29R described later, and the developing cartridge 3 is brought into a mounted state in a state where the developing cartridge 4 is mounted to the drum cartridge 2.

<Guide Surface 29L>

The guide surface 29L is positioned between the photosensitive drum 4 and the pressing member 26L in the front-rear direction. The guide surface 29L is sized to guide the developing cartridge 3.

<Guide Surface 29R>

The guide surface 29R is positioned between the photosensitive drum 4 and the pressing member 26R in the front-rear direction. The guide surface 29R is sized to guide the developing cartridge 3.

<Locking Lever 27>

Figure 14:
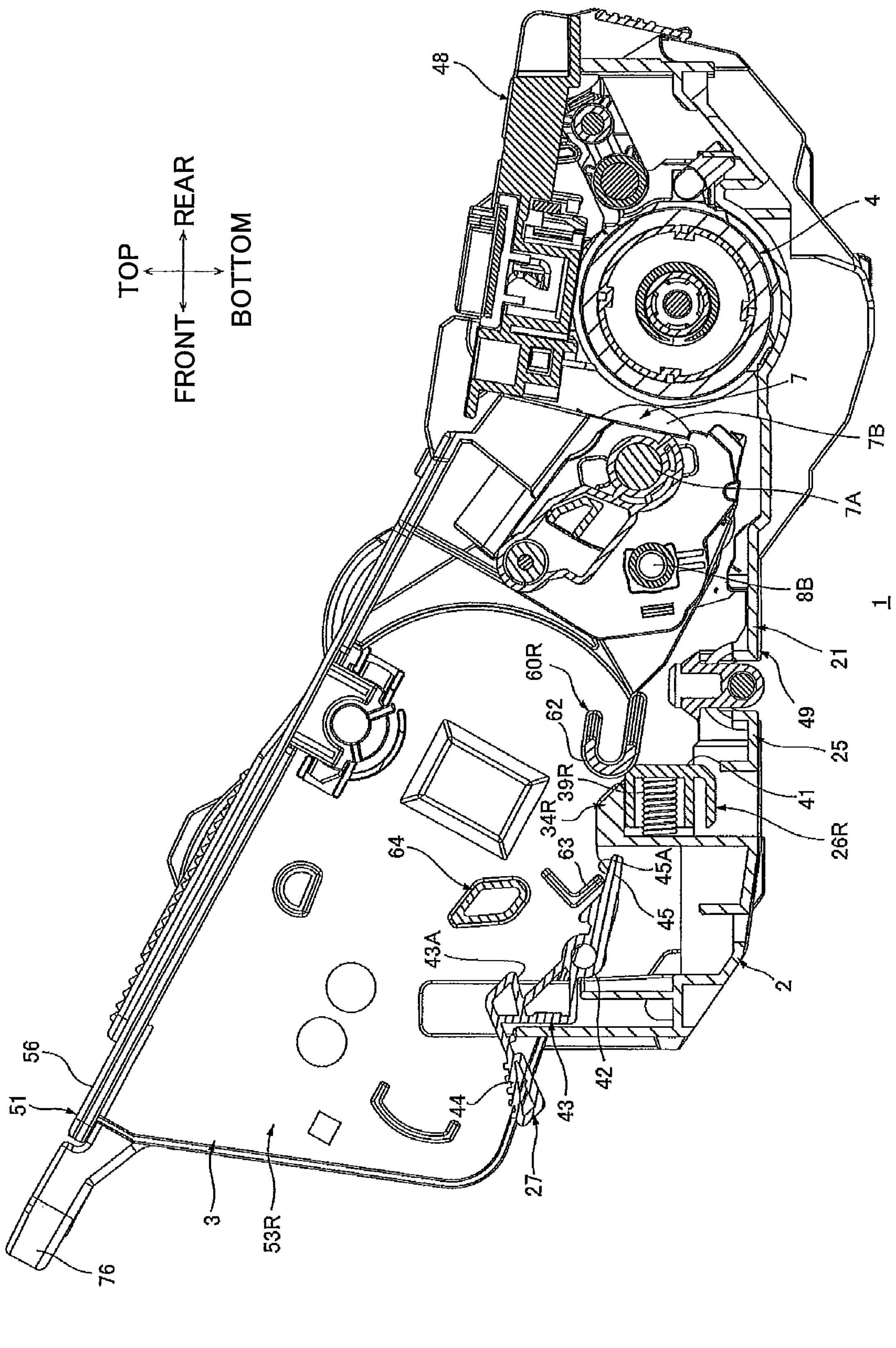
FIG. 14 is an example of a cross-sectional view taken along D-D in FIG. 11, in which the locking lever is in an unlock position.

As shown in FIGS. 9, 13, and 14, a locking lever 27 is positioned at the opposite side of the pressing member 26R from the photosensitive drum 4 in the front-rear direction. The locking lever 27 is positioned between the left wall 24L and the right wall 24R in the left-right direction. The locking lever 27 is rotatably supported at the right wall 24R. The locking lever 27 can pivot about a shaft extending in the left-right direction. The locking lever 27 can pivot between a lock position (see FIG. 13) and an unlock position (see FIG. 14). In the following description, the locking lever 27 will be referenced based on the lock position. The locking lever 27 includes a rotational shaft 42, a locking part 43, an operating part 44, and a lifting part 45.

The rotational shaft 42 has a columnar shape that extends in the left-right direction. The rotational shaft 42 is rotatably supported at the right wall 24R.

The locking part 43 can lock the locking protrusion 64. The locking part 43 has a locking surface 43A. As shown in FIG. 13, the locking surface 43A locks the locking protrusion 64 relative to the mounting frame 49 when the developing cartridge 3 is mounted to the drum cartridge 2.

The operating part 44 has a plate shape. The operating part 44 is gripped by an operator. When the operator pivotally moves the operating part 44, the operating part 44 pivots between the lock position and the unlock position.

The lifting part 45 has a lifting surface 45A. As shown in FIG. 14, the lifting surface 45A contacts the lifting protrusion 63 when the locking lever 27 is in the unlock position.

More specifically, the locking protrusion 64 of the developing cartridge 3 contacts the lifting surface 45A when the developing cartridge 3 is mounted to the drum cartridge 2. Thus, when the operator applies force on the developing cartridge 3 toward the drum cartridge 2, the locking lever 27 pivots about the rotational shaft 42 and the locking surface 43A locks the locking protrusion 64 relative to the drum cartridge 2. As a result, the developing cartridge 3 is mounted to the drum cartridge 2, as illustrated in FIGS. 12 and 13. In this state, the pressing member 26L presses the protrusion 60L toward the photosensitive drum 4, and the pressing member 26R presses the protrusion 60R toward the photosensitive drum 4.

When the operator pivotally moves the locking lever 27 from its lock position to its unlock position, the locking surface 43A releases the locked state of the locking protrusion 64, and the lifting surface 45A contacts the lifting protrusion 63. Next, the lifting surface 45A lifts the lifting protrusion 63. As a result, the developing cartridge 3 is released from the locked state relative to the drum cartridge 2.

6. Advantageous Effects of First Embodiment

In the first embodiment described above, the developing-roller gear 68 is meshed with the gear part 72 of the developing coupling 67 at one side of the developing coupling 67, and the large-diameter gear 70A of the idle gear 70 is meshed with the gear part 72 of the developing coupling 67 at the other side of the developing coupling 67. This configuration enables the developing coupling 67 to rotate with stability. Further, since the small-diameter gear 70B of the idle gear 70 is meshed with the gear part 71A of the agitator 11, the peripheral speed of the agitator 11 can be modified.

In addition, the protrusion 60L is positioned between the developing coupling 67 and the agitator 11. Accordingly, the protrusion 60L can reliably receive a pressing force from the pressing member 26L toward the photosensitive drum 4 without preventing the gear part 71A from rotating.

In other words, the protrusion 60L is positioned at the outer surface of the left wall 53L between the center axis A3 and the center axis A2 in a direction connecting the center axis A3 and the center axis A2 (an example of a second direction), and also positioned outside the addendum circle C10 of the developing-roller gear 68, the addendum circle C9 of the gear part 72, the addendum circle C1 of the large-diameter gear 70A, and the addendum circle C2 of the small-diameter gear 70B. The gear part 71A is spaced apart from the protrusion 60L in the predetermined direction. Consequently, the development coupling 67, the large-diameter gear 70A, the small-diameter gear 70B and the gear part 71A can be rotated even when the protrusion 60L is disposed at a position near the developing roller 7 (specifically, between the center axis A3 and the center axis A2).

More specifically, the protrusion 60L is positioned between the idle-gear shaft 58 and the agitator-gear shaft 59 in the front-rear direction and, furthermore, the protrusion 60L is positioned outside both the addendum circle C1 of the large-diameter gear 70A and the addendum circle C2 of the small-diameter gear 70B in the front-rear direction. The protrusion 60L is positioned inside the addendum circle C3 of the gear part 71A in the front-rear direction. The edge of the gear part 71A facing the left wall 53L in the left-right direction is spaced apart from the protrusion 60L. Specifically, the edge of the gear part 71A facing the left wall 53L is farther from the left wall 53L than the protrusion 60L from the left wall 53L. In the first embodiment, the left wall 53L is separated from the edge of the agitator gear 71 facing the left wall 53L by the distance D1. Further, the length of the protrusion 60L extending from the left wall 53L is the length D2. Here, the distance D1 is greater than the length D2. Therefore, the protrusion 60L can reliably receive a pressing force from the pressing member 26L toward the photosensitive drum 4 without preventing the gear part 71A from rotating, even when the protrusion is positioned within the addendum circle C3 of the gear part 71A in the front-rear direction.

Further, when the curved surface 61 contacts the pressing member 26L, the curved surface 61 can suitably receive a pressing force from the pressing member 26L toward the photosensitive drum 4. Similarly, when the curved surface 62 contacts the pressing member 26R, the curved surface 62 can suitably receive a pressing force from the pressing member 26R toward the photosensitive drum 4.

7. Mode of Use for Process Cartridge

As shown in FIG. 15, the process cartridge 1 is mounted to an image forming apparatus 81.

The image forming apparatus 81 is an electrophotographic monochromatic printer. The image forming apparatus 81 includes an apparatus body 82, a scanning unit 83, and a fixing unit 84.

The apparatus body 82 has a box-like shape. The apparatus body 82 includes an opening 85, a front cover 86, a paper tray 87, and a discharge tray 88.

The opening 85 is positioned at a front end of the apparatus body 82. The process cartridge 1 is inserted into the apparatus body 82 through the opening 85.

The front cover 86 is positioned at the front end of the apparatus body 82. The front cover 86 has a plate shape. The front cover 86 is configured to open and close the opening 85.

The paper tray 87 is configured to accommodate a plurality of sheets P.

The scanning unit 83 is positioned above the process cartridge 1. The scanning unit 83 is configured to irradiate a laser beam toward the photosensitive drum 4.

The fixing unit 84 is positioned at the rear of the process cartridge 1. The fixing unit 84 includes a heating roller 89, and a pressure roller 90.

When the image forming apparatus 81 begins an image-forming operation, the scorotron charger 5 applies a uniform charge to the surface of the photosensitive drum 4. The scanning unit 83 exposes the surface of the photosensitive drum 4 to a laser beam. As a result, an electrostatic latent image is formed on the surface of the photosensitive drum 4 based on image data.

By rotating the agitator shaft 11A, the agitator 11 agitates toner within the toner-accommodating section 10 and supplies toner to the supply roller 8. The supply roller 8 supplies toner received from the agitator 11 to the developing roller 7. At this time, the toner is positively tribocharged between the developing roller 7 and the supply roller 8, and the charged toner is carried on the developing roller 7. The thickness-regulating blade 9 regulates the toner carried on the developing roller 7 to a layer of uniform thickness.

The toner carried on the developing roller 7 is supplied to the electrostatic latent image on the surface of the photosensitive drum 4 so that the photosensitive drum 4 can carry a toner image on its surface.

By the rotation of various rollers, one sheet P of the plurality of sheets P is supplied from the paper tray 87 one at a time to the position between the photosensitive drum 4 and the transfer roller 6 at a prescribed timing. When the one sheet P passes between the photosensitive drum 4 and the transfer roller 6, the toner image carried on the surface of the photosensitive drum 4 is transferred onto the one sheet P.

Next, the one sheet P is subjected to heat and pressure while passing between the heating roller 89 and the pressure roller 90. At this time, the toner image on the one sheet P is thermally fixed to the one sheet P. Subsequently, the one sheet P is discharged into the discharge tray 88.

While the protrusion 60L is positioned inside the addendum circle C3 of the gear part 71A in the front-rear direction in the first embodiment described above, the protrusion 60L may be positioned outside the addendum circle C3 of the gear part 71A in the front-rear direction. The protrusion 60L can reliably receive a pressing force from the pressing member 26L toward the photosensitive drum 4 without preventing the gear part 71A from rotating, even when the protrusion 60L is positioned outside the addendum circle C3 of the gear part 71A in the front-rear direction.

8. Second Embodiment

Figure 16B:
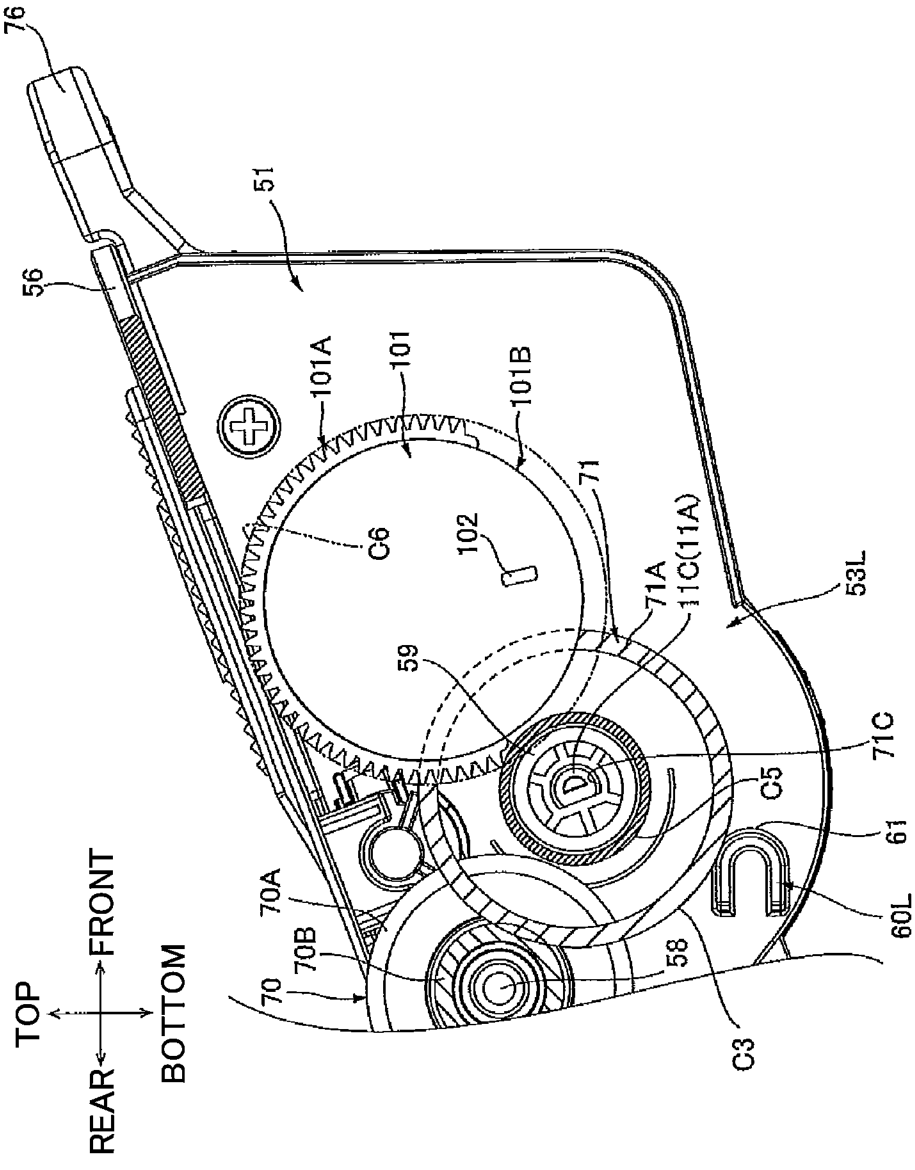
FIG. 16B is an explanatory view illustrating the developing cartridge according to the second embodiment.

Next, a developing cartridge 3 according to a second embodiment will be described with reference to FIGS. 16A and 16B, wherein like parts and components described in the first embodiment are designated with the same reference numerals to avoid duplicating description.

In the first embodiment described above, the gear part 71A of the agitator gear 71 is meshed only with the small-diameter gear 70B of the idle gear 70. However, a detected rotary body 101, such as that described in Japanese Patent Application Publication No. 2011-215374, may be positioned at the outer surface of the left wall 53L, as shown in FIG. 16B, for example. In the second embodiment, a drive force may be transmitted from the agitator gear 71 to the detected rotary body 101, as illustrated in FIGS. 16A and 16B.

Figure 16A:
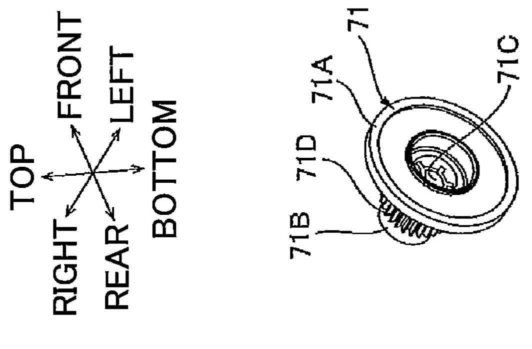
FIG. 16A is an example of a perspective view as viewed from the upper-rear side of an agitator gear provided at a developing cartridge according to a second embodiment.

In this case, the agitator gear 71 includes a second gear part 71D in addition to the gear part 71A, as shown in FIG. 16A.

The second gear part 71D is positioned between the gear part 71A and the cylindrical part 71B in the left-right direction. The second gear part 71D has a cylindrical shape that extends rightward from a right surface of the gear part 71A. The second gear part 71D is arranged coaxially with the gear part 71A. An outer diameter of the second gear part 71D is smaller than the outer diameter of the gear part 71A. The second gear part 71D has a plurality of gear teeth formed around an outer circumference of the second gear part 71D. An addendum circle C5 of the second gear part 71D is positioned inside the addendum circle C3 of the gear part 71A and is spaced apart from the protrusion 60L. In other words, the protrusion 60L is positioned outside the addendum circle C5 of the second gear part 71D.

The detected rotary body 101 has a disc shape with a thickness in the left-right direction. The detected rotary body 101 includes a toothed part 101A, a toothless part 101B, and a detection protrusion 102.

The toothed part 101A occupies approximately two-thirds of a circumference of the detected rotary body 101, i.e., a region of the detected rotary body 101 equivalent to a sector shape having a central angle of approximately 240°. The toothed part 101A has a plurality of gear teeth formed along the circumference of the detected rotary body 101. An addendum circle C6 of the toothed part 101A is spaced apart from the protrusion 60L. In other words, the protrusion 60L is positioned outside the addendum circle C6 of the toothed part 101A.

The toothless part 101B occupies approximately the remaining one-third of the circumference of the detected rotary body 101, excluding the region occupied by the toothed part 101A. The toothless part 101B is a region of the detected rotary body 101 equivalent to a sector shape with a central angle of approximately 120°. The toothless part 101B has no gear teeth.

The detection protrusion 102 is disposed at a position shifted radially outside of a center of the detected rotary body 101. The detection protrusion 102 has a square columnar shape that protrudes leftward from a left surface of the detected rotary body 101.

When a developing cartridge 3 in an unused (new) state is mounted to the apparatus body 82 of the image forming apparatus 81, the detected rotary body 101 can rotate for a prescribed duration because the toothed part 101A meshes with the second gear part 71D of the agitator gear 71. The detected rotary body 101 stops rotating when the toothed part 101A does not mesh with the second gear part 71D of the agitator gear 71.

As described in Japanese patent application publication No. 2011-215374, while the detected rotary body 101 rotates, a rib (not shown) provided on the casing 51 causes the detected rotary body 101 to move leftward and the detection protrusion 102 advances outside the gear cover 66 through an opening formed in the gear cover 66. After the detected rotary body 101 moves leftward, the detected rotary body 101 then moves rightward. While the detected rotary body 101 moves rightward, the detection protrusion 102 retracts into the gear cover 66 through the opening formed in the gear cover 66.

When the detected rotary body 101 moves leftward, a sensor (not shown) provided in the apparatus body 82 detects the detection protrusion 102. Through this detection, the image forming apparatus 81 determines that the developing cartridge 3 is an unused (new) product.

In the second embodiment, the second gear part 71D of the agitator gear 71 is an example of a second agitator gear, and the addendum circle C5 of the second gear part 71D is an example of an addendum circle of the second agitator gear. Further, the gear part 71A of the agitator gear 71 is an example of a first agitator gear, and the addendum circle C3 of the gear part 71A is an example of an addendum circle of the first agitator gear. The detected rotary body 101 is an example of a friction gear, and the addendum circle C6 of the toothed part 101A of the detected rotary body 101 is an example of an addendum circle of the friction gear. The detection protrusion 102 is an example of a protrusion. The friction gear, for example, is a gear that rotates when driven through contact such as a meshing with another gear. Further, the friction gear, for example, is a rotary body that rotates when driven through contact such as a meshing with another gear.

In the second embodiment described above, the second gear part 71D of the agitator gear 71 can transmit a drive force to the detected rotary body 101.

The second embodiment can obtain the same advantageous effects described above in the first embodiment.

9. Third Embodiment

Next, a developing cartridge 3 according to a third embodiment will be described with reference to FIGS. 17 through 22, wherein like parts and components described in the first and second embodiments are designated with the same reference numerals to avoid duplicating description.

In the third embodiment, the detecting unit 238 is applied instead of the detected rotary body 101 of the second embodiment.

Figure 17:
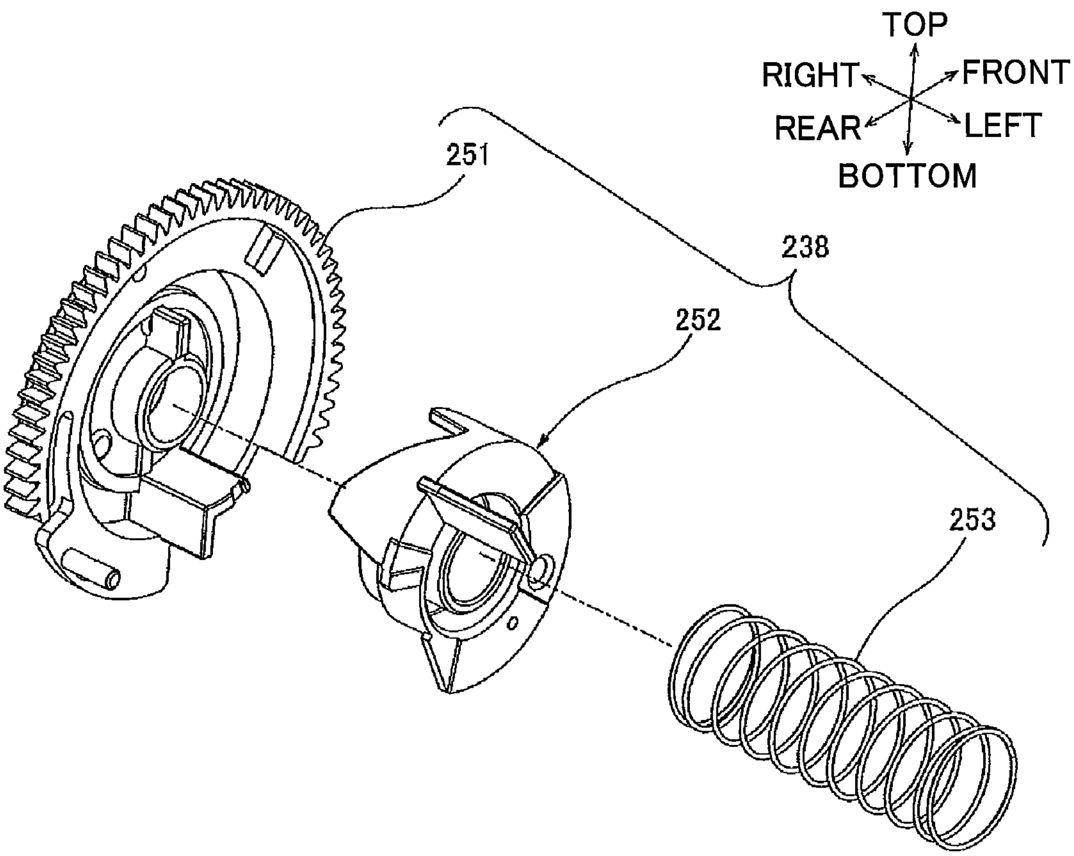
FIG. 17 is an example of a perspective view of a detecting unit according to a third embodiment.

As shown in FIG. 17, the detecting unit 238 includes a partially toothless gear 251 as an example of a friction gear, a detecting member 252, and a compressed spring 253.

Figure 18A:
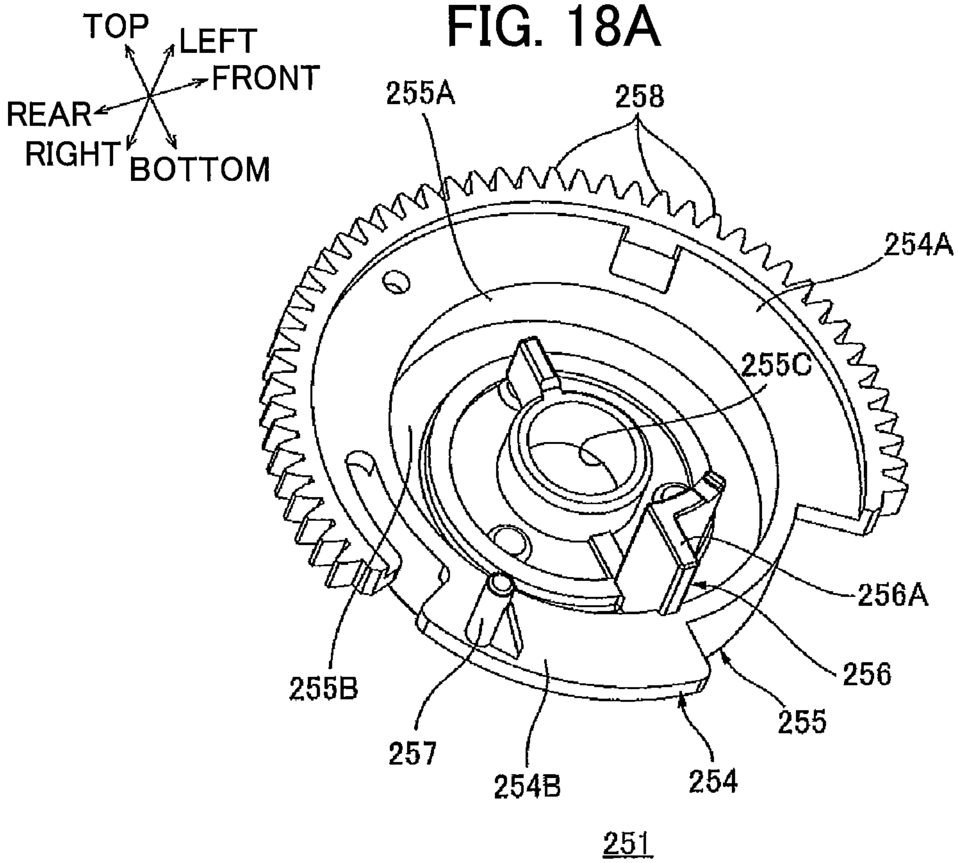
FIG. 18A is an example of a perspective view as viewed from the left of a partially toothless gear shown in FIG. 17.
Figure 18B:
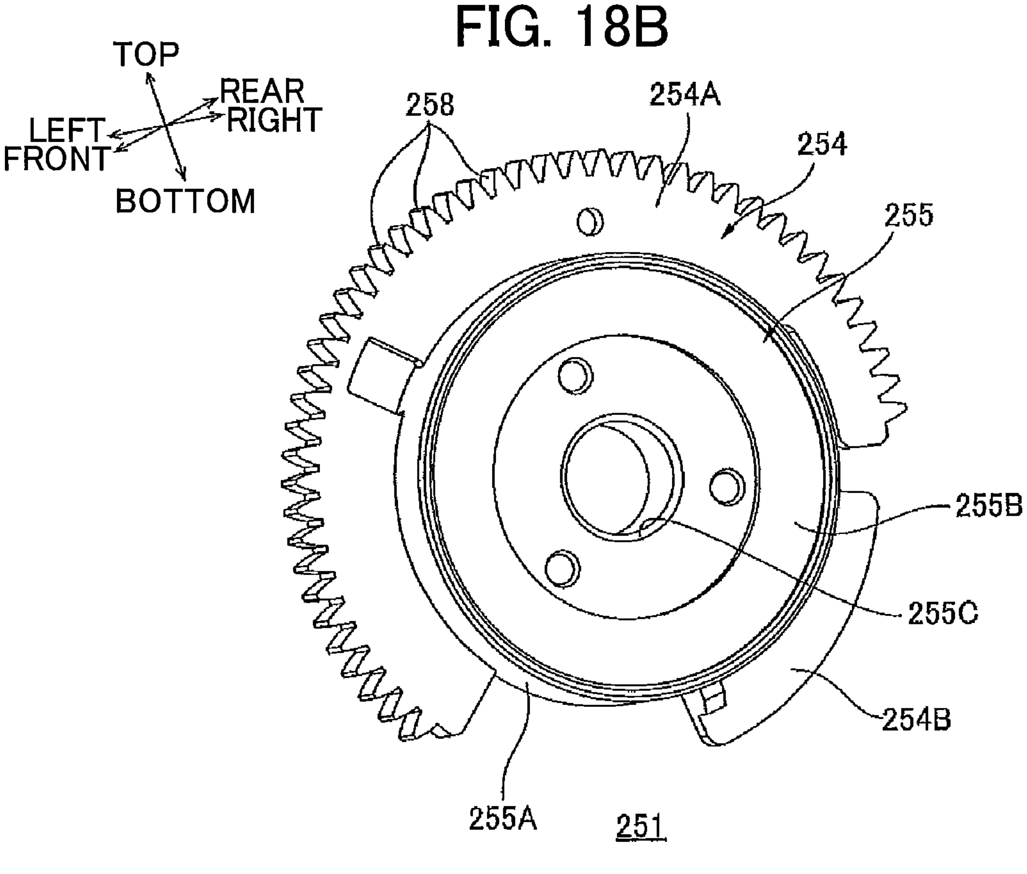
FIG. 18B is a perspective view as viewed from the right of the partially toothless gear shown in FIG. 18A.

As shown in FIGS. 18A and 18B, the partially toothless gear 251 is integrally provided with a gear cylindrical part 255, a sliding rib 256, a gear flange part 254, and a boss 257.

The gear cylindrical part 255 has a cylindrical shape that extends in the left-right direction. More specifically, the gear cylindrical part 255 includes a circumferential wall 255A, and a contact wall 255B.

The circumferential wall 255A has a cylindrical shape that extends in the left-right direction. The contact wall 255B is positioned at a right edge of the circumferential wall 255A. The contact wall 255B has a disc shape with a thickness in the left-right direction. The contact wall 255B has an insertion hole 255C.

The insertion hole 255C is positioned at a center region of the contact wall 255B. The insertion hole 255C is a circular shaped hole. The insertion hole 255C penetrates the contact wall 255B in the left-right direction. A center of the insertion hole 255C corresponds to a center of the contact wall 255B. A diameter of the insertion hole 255C is slightly larger than an outer diameter of a partially-toothless-gear shaft 236.

As shown in FIG. 18A, the sliding rib 256 is positioned at a left surface of the contact wall 255B and is spaced apart from the insertion hole 255C. The sliding rib 256 has a plate shape that extends in a radial direction of the gear cylindrical part 255. The sliding rib 256 protrudes leftward from the left surface of the contact wall 255B. A left-right dimension of the sliding rib 256 is greater than a left-right dimension of the circumferential wall 255A.

The gear flange part 254 expands radially outward from a left edge of the circumferential wall 255A. The gear flange part 254 includes a toothed part 254A, and a toothless part 254B.

The toothed part 254A has a plate shape that extends in a circumferential direction of the circumferential wall 255A and the toothed part 254A has a C-shape in a side view. The toothed part 254A extends radially outward from the left edge of the circumferential wall 255A over a region having a central angle of approximately 240°. Further, the toothed part 254A has a plurality of gear teeth 258. An addendum circle C8 of the toothed part 254A is spaced apart from the protrusion 60L. In other words, the protrusion 60L is positioned outside the addendum circle C8 of the toothed part 254A.

The toothless part 254B is positioned spaced apart from both a front edge of the toothed part 254A and a rear edge of the toothed part 254A in the circumferential direction of the circumferential wall 255A. The toothless part 254B has a plate shape that extends in the circumferential direction of the circumferential wall 255A. The toothless part 254B expands radially outward from the left edge of the circumferential wall 255A over a region having a central angle of approximately 45°. A radius of curvature for the toothless part 254B is smaller than a radius of curvature for the toothed part 254A. The toothless part 254B has no gear teeth on a circumferential surface of the toothless part 254B. Hence, the partially toothless gear 251 has a circumferential portion provided with the plurality of gear teeth 258, and the remaining circumferential portion provided with no gear teeth.

The boss 257 is positioned at a left surface of the toothless part 254B and is spaced apart from the sliding rib 256. The boss 257 has a columnar shape that extends in the left-right direction. The boss 257 protrudes leftward from the left surface of the toothless part 254B at an outer radial portion of the toothless part 254B.

The partially-toothless-gear shaft 236 is inserted in to the insertion hole 255C in a state where the partially toothless gear 251 can rotate relative to the partially-toothless-gear shaft 236, as a result, the partially toothless gear 251 is supported at the partially-toothless-gear shaft 236 provided at the casing 51. With this configuration, the partially toothless gear 251 can rotate about the partially-toothless-gear shaft 236. When a drive force is transmitted to the partially toothless gear 251 from the agitator gear 71, the partially toothless gear 251 rotates irreversibly from an initial position to a terminal position via a drive transmission position.

Figure 19A:
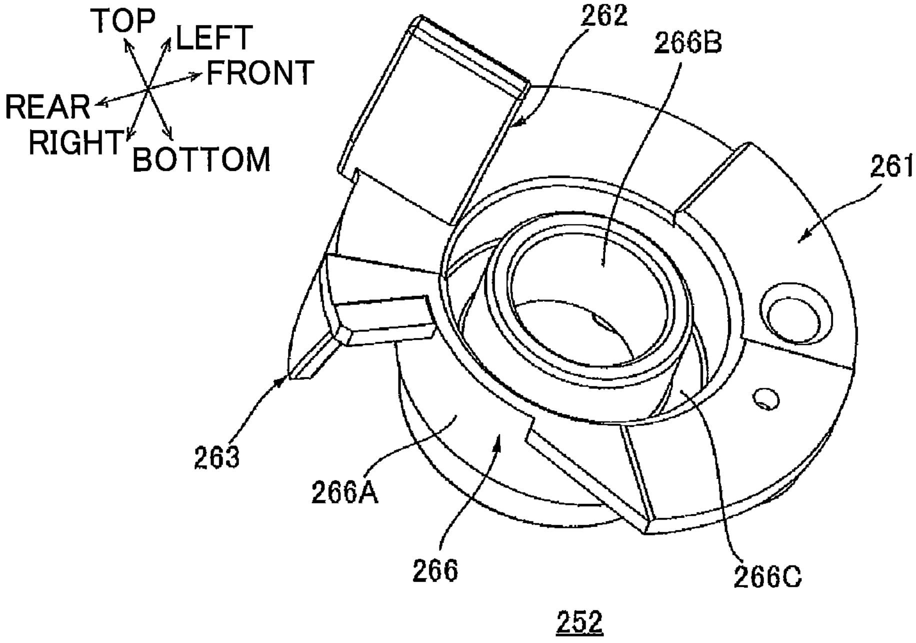
FIG. 19A is an example of a perspective view as viewed from the left of a detecting member shown in FIG. 17.
Figure 19B:
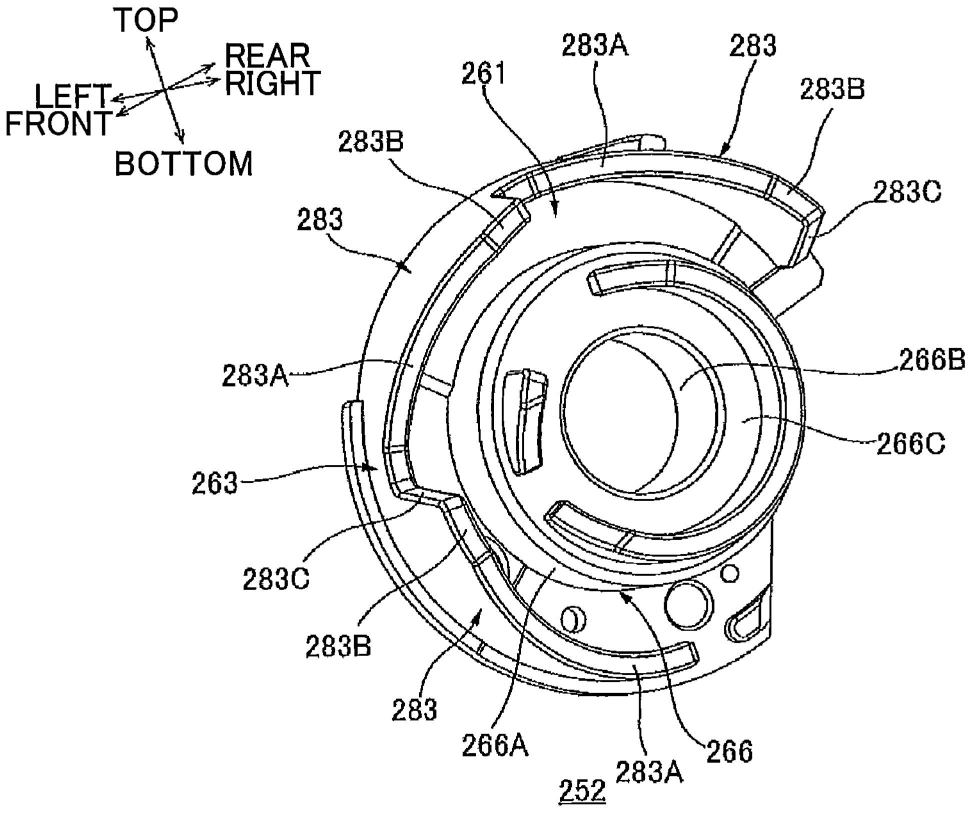
FIG. 19B is an example of a perspective view as viewed from the right of the detecting member shown in FIG. 19A.

As shown in FIG. 17, the detecting member 252 is positioned at the left side of the partially toothless gear 251. As shown in FIGS. 19A and 19B, the detecting member 252 is integrally provided with a detection cylindrical part 266, a detection flange part 261, a detection protrusion 262 as an example of a protrusion part, and a displacing part 263.

The detection cylindrical part 266 has an outer cylinder 266A, an inner cylinder 266B, and a connecting wall 266C.

The outer cylinder 266A has a cylindrical shape that extends in the left-right direction.

The inner cylinder 266B has a cylindrical shape that extends in the left-right direction. The inner cylinder 266B has a through-hole extending in the left-right direction. The through-hole penetrates the inner cylinder 266B in the left-right direction. An outer diameter of the inner cylinder 266B is smaller than an inner diameter of the outer cylinder 266A, and an inner diameter of the inner cylinder 266B is equivalent to the outer diameter of the partially-toothless-gear shaft 236. Further, a left-right dimension of the inner cylinder 266B is equivalent to a left-right direction of the outer cylinder 266A. The inner cylinder 266B is positioned inside the outer cylinder 266A such that a central axis of the inner cylinder 266B is aligned with a central axis of the outer cylinder 266A.

The connecting wall 266C connects an inner peripheral surface of the outer cylinder 266A at a right end of the outer cylinder 266A and an outer peripheral surface of the inner cylinder 266B at a right end of the inner cylinder 266B. The connecting wall 266C has an annular shape.

The detection flange part 261 has an annular shape. The detection flange part 261 expands radially outward from a left end of the outer cylinder 266A.

As shown in FIG. 19A, the detection protrusion 262 is positioned at a left surface of the detection flange part 261 at its top end portion. The detection protrusion 262 has a plate shape that extends in the left-right direction. The detection protrusion 262 extends leftward from the detection flange part 261.

As shown in FIG. 19B, the displacing part 263 is positioned at a right surface of the detection flange part 261 along a circumferential edge of the detection flange part 261. The displacing part 263 has a cam part 283. The cam part 283 protrudes rightward from the detection flange part 261. In the third embodiment, a plurality, and specifically three, of the cam parts 283 is provided. The plurality of cam parts 283 are positioned one after another along a circumferential direction of the detection flange part 261. Each cam part 283 has a first sloped surface 283A, a parallel surface 283B, and a second sloped surface 283C. At least one cam part 283 may be provided.

The first sloped surface 283A is positioned at the upstream side of the cam part 283 in a rotating direction of the partially toothless gear 251. The first sloped surface 283A slopes rightward toward a downstream end of the rotating direction of the partially toothless gear 251. In other words, the first sloped surface 283A slopes to the right in the rotating direction of the partially toothless gear 251. More specifically, a distance between the detection flange part 261 and the first sloped surface 283A becomes longer in the rotating direction of the partially toothless gear 251.

The parallel surface 283B is formed continuously with the first sloped surface 283A and extends downstream of the rotating direction of the partially toothless gear 251. The parallel surface 283B is parallel to the detection flange part 261 so as to maintain a uniform distance from the detection flange part 261 in the left-right direction.

The second sloped surface 283C is positioned at the downstream side of the rotating direction of the partially toothless gear 251. The second sloped surface 283C is formed continuously with the parallel surface 283B. The second sloped surface 283C slopes leftward toward a downstream end of the rotating direction of the partially toothless gear 251. In other words, the second sloped surface 283C slopes to the left in the rotating direction of the partially toothless gear 251. More specifically, a distance between the detection flange part 261 and the second sloped surface 283C becomes shorter in the rotating direction of the partially toothless gear 251.

When the displacing part 263 has a plurality of cam parts 283, the second sloped surface 283C for one cam part 283 is formed continuously with the first sloped surface 283A of the next cam part 283. The plurality of cam parts 283 is provided along the detection flange part 261 in this manner.

Figure 20A:
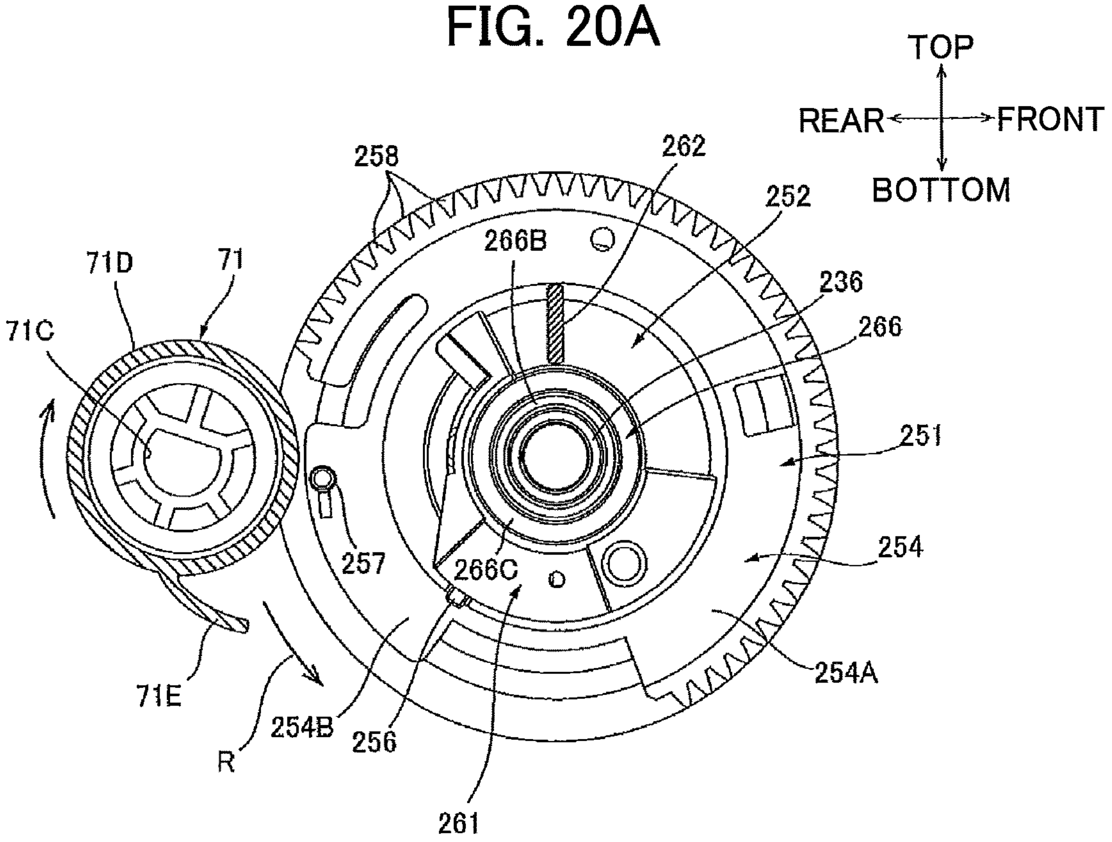
FIG. 20A illustrates an example of the detecting unit in FIG. 17 in which the partially toothless gear is in an initial position.

As shown in FIG. 20A, the partially-toothless-gear shaft 236 penetrates the through-hole formed in the inner cylinder 266B, and the detecting member 252 is positioned at the left of the partially toothless gear 251.

As shown in FIG. 17, the compressed spring 253 is positioned at the left of the detecting member 252. The compressed spring 253 has an air-core coil structure that extends in the left-right direction. An inner diameter of the compressed spring 253 is equivalent to the outer diameter of the inner cylinder 266B. The inner cylinder 266B is inserted into a right end portion of the compressed spring 253, as a result, the compressed spring 253 is supported at the detecting member 252.

Further, the compressed spring 253 is interposed in a compressed state between the connecting wall 266C of the detecting member 252 and the gear cover 66. With this configuration, the compressed spring 253 constantly urges the detecting member 252 rightward.

Next, a state of the detecting unit 238 prior to the initial use of the developing cartridge 3 (when the developing cartridge 3 is unused) will be described.

In a new developing cartridge 3, the partially toothless gear 251 is in the initial position shown in FIG. 20A.

When the partially toothless gear 251 is in the initial position, a downstream edge of the toothed part 254A in the rotating direction R of the partially toothless gear 251 is at a position separated from the second gear part 71D, and the toothless part 254B faces the second gear part 71D and the toothless part 254B is slightly separated from the second gear part 71D.

Hence, when the partially toothless gear 251 is in the initial position, the gear teeth 258 of the partially toothless gear 251 are not meshed with the second gear part 71D.

Figure 20B:
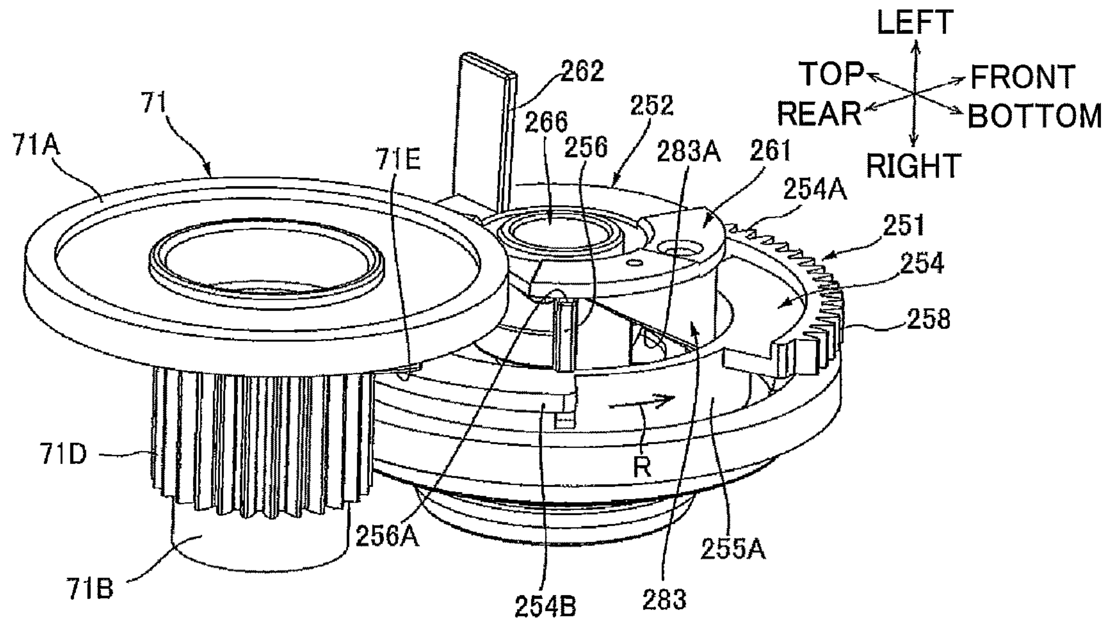
FIG. 20B is an example of a perspective view as viewed from below of the detecting unit in FIG. 20A.

Further, an end 256A of the sliding rib 256 is positioned at the rear of the first sloped surface 283A of one of the cam parts 283 and is in contact with the right surface of the detection flange part 261, as shown in FIG. 20B. The detecting member 252 is in a retracted position by an urging force of the compressed spring 253.

As illustrated in FIG. 2, when the developing coupling 67 rotates in a prescribed rotating direction, the developing-roller gear 68, the supply-roller gear 69, and the idle gear 70 rotate in a direction opposite the rotating direction of the developing coupling 67. At this time, the developing roller 7 rotates together with the rotation of the developing-roller gear 68, and the supply roller 8 rotates together with the rotation of the supply-roller gear 69. Further, when the idle gear 70 rotates, the agitator gear 71 rotates in a direction opposite the rotating direction of the idle gear 70, as illustrated in FIG. 20A.

Figure 21A:
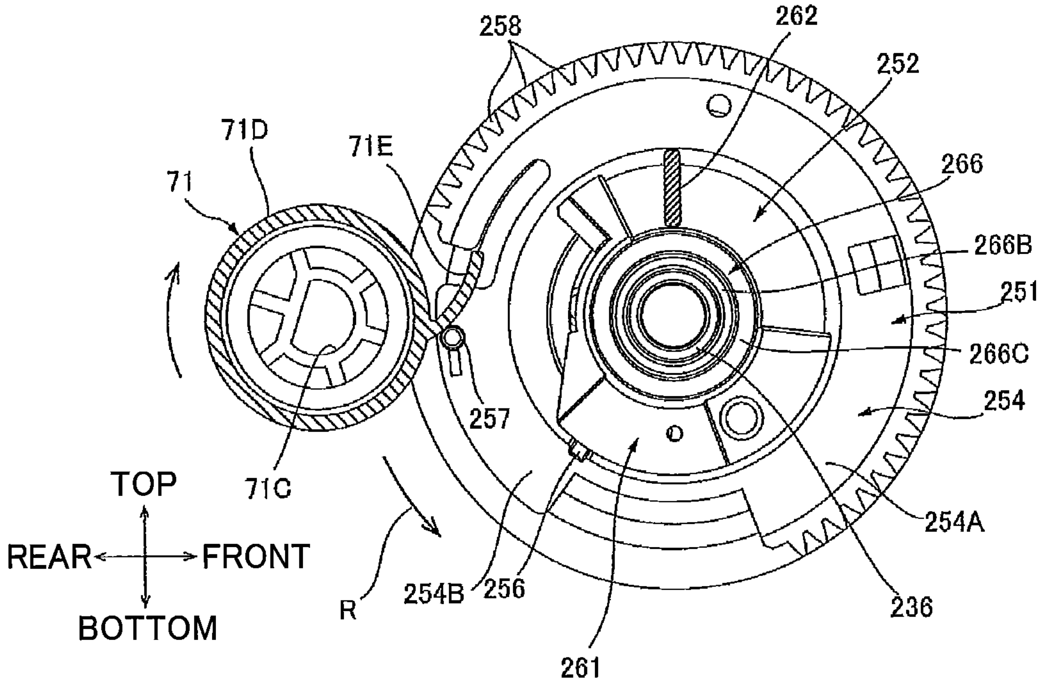
FIG. 21A illustrates an example of a state where a rib provided at the agitator gear is in contact with a boss provided at the partially toothless gear.

As illustrated in FIG. 21A, when the agitator gear 71 rotates, a rib 71E provided at an inner surface of the gear part 71A of the agitator gear 71 rotates together with the agitator gear 71, and contacts the boss 257 of the partially toothless gear 251, which is in its initial position, and then presses the boss 257 in a direction diagonally downward and forward. Through the pressure applied by the rib 71E to the boss 257, the partially toothless gear 251 rotates from the initial position in the rotating direction R about a center axis A6 of the partially-toothless-gear shaft 236.

Figure 21B:
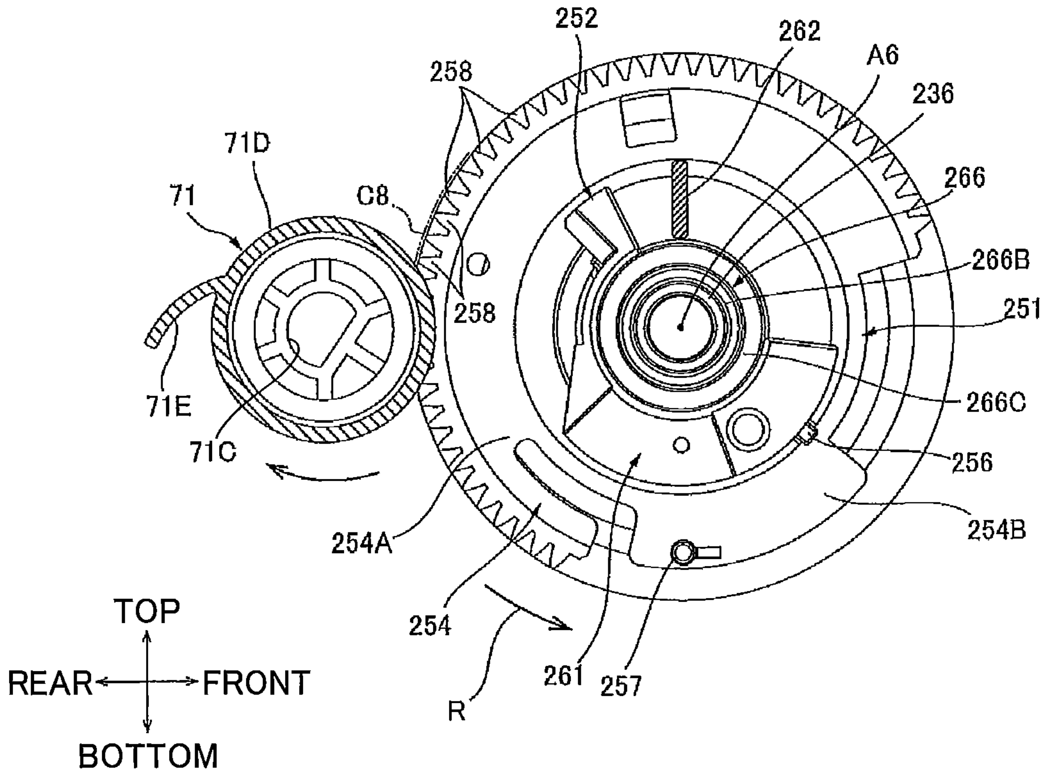
FIG. 21B illustrates an example of a state where the partially toothless gear is in a drive transmission position.

Consequently, the partially toothless gear 251 arrives at the drive transmission position, as illustrated in FIGS. 21A and 21B. Next, the gear teeth 258 of the toothed part 254A become meshed with the second gear part 71D. That is, when the partially toothless gear 251 is in the drive transmission position, the gear teeth 258 of the partially toothless gear 251 are meshed with the second gear part 71D, and the second gear part 71D is positioned within the addendum circle C8 of the toothed part 254A.

As the partially toothless gear 251 continues to rotate in the rotating direction R, the sliding rib 256 of the partially toothless gear 251 moves in the rotating direction R together with the rotating partially toothless gear 251, as illustrated in FIG. 20B.

At this time, the end 256A of the sliding rib 256 slides along the first sloped surface 283A of the one of the cam parts 283 in the rotating direction R and pushes the first sloped surface 283A leftward. Consequently, the detecting member 252 gradually moves leftward from the retracted position against the urging force of the compressed spring 253. In other words, the detecting member 252 moves leftward according to rotation of the partially toothless gear 251, and the detection protrusion 262 moves leftward together with the movement of the detecting member 252. As the partially toothless gear 251 continues to rotate, the end 256A of the sliding rib 256 moves from the first sloped surface 283A to the parallel surface 283B of the one of the cam parts 283 and contacts the parallel surface 283B. At this time, the detecting member 252 is in the advanced position, i.e., a position farthest advanced to the left against the urging force of the compressed spring 253.

When the detecting member 252 is in the advanced position, the detection protrusion 262 has advanced leftward through a slit 275 formed in the gear cover 66 (see FIG. 1). When the detection protrusion 262 advances leftward through the slit 275, the detection protrusion 262 contacts an actuator (not shown) provided in the image forming apparatus 81. This contact causes the actuator to move from a non-detection position to a detection position. A light-receiving element of a photosensor provided in the image forming apparatus 81 receives detection light when the actuator moves to the detection position, and the photosensor outputs a light-reception signal. As the partially toothless gear 251 continues to rotate, the end 256A of the sliding rib 256 moves from the parallel surface 283B to the second sloped surface 283C of the one of the cam parts 283 and contacts the second sloped surface 283C. The end 256A of the sliding rib 256 slides along the second sloped surface 283C in the rotating direction R. Accordingly, the detecting member 252 gradually moves rightward due to the urging force of the compressed spring 253. As a result, the detection protrusion 262 is gradually retracted into the gear cover 66. When the detection protrusion 262 separates from the actuator in the image forming apparatus 81, an urging member (not shown) provided in the image forming apparatus 81 returns the actuator from the detection position to the non-detection position. That is, the actuator in the image forming apparatus 81 is moved to a position between a light-emitting element and the light-receiving element of the photosensor, and the actuator prevents the light-receiving element of the photosensor from receiving the detection light and halting output of the light-reception signal from the photosensor.

As the partially toothless gear 251 continues to rotate, the detecting member 252 again moves from the retracted position to the advanced position and from the advanced position to the retracted position twice for the remaining two cam parts 283. Accordingly, the actuator in the image forming apparatus 81 is moved from the non-detection position to the detection position and from the detection position to the non-detection position two times. Consequently, the photosensor outputs two light-reception signals. In other words, the photosensor outputs a total of three light-reception signals during the detection operation in the third embodiment.

As described earlier, the detecting member 252 may be provided with at least one cam part 283. Thus, the detecting member 252 may move from the retracted position to the advanced position and from the advanced position to the retracted position once for each of the remaining two cam parts 283.

Figure 22:
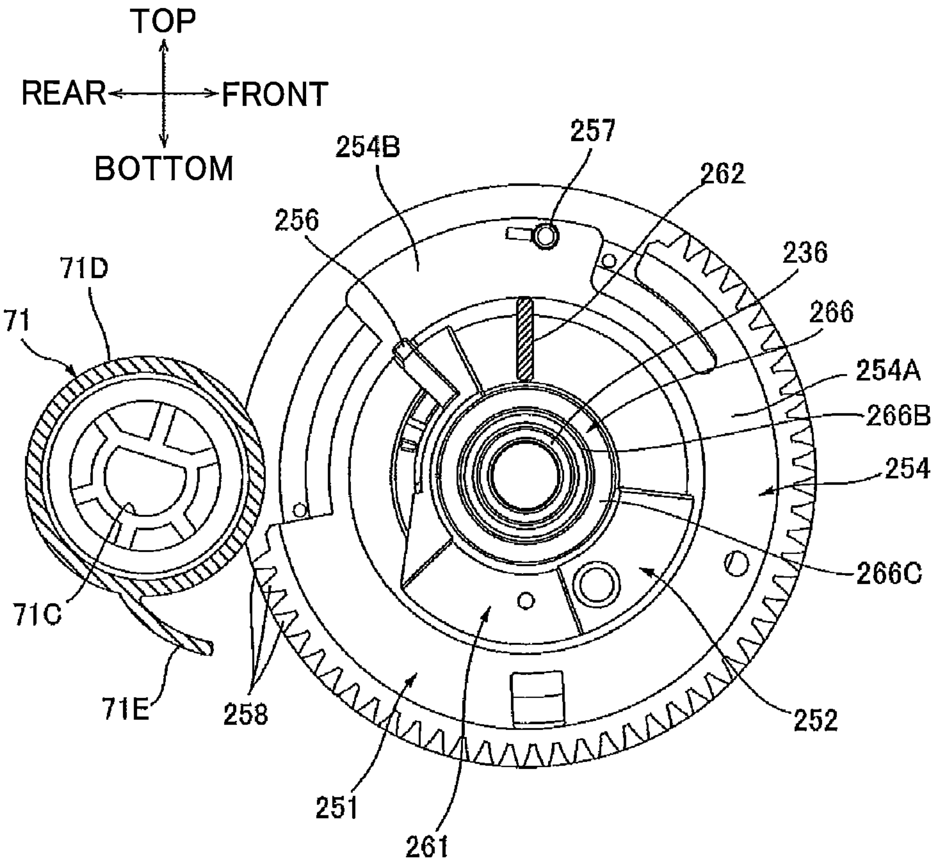
FIG. 22 illustrates an example of a state where the partially toothless gear is in a terminal position.

When the toothed part 254A of the partially toothless gear 251 subsequently separates from the second gear part 71D, as illustrated in FIG. 22, the partially toothless gear 251 stops rotating. When the operation for rotating the partially toothless gear 251 is completed, the partially toothless gear 251 has arrived in the terminal position.

In this way, the image forming apparatus 81 can determine whether the developing cartridge 3 is an unused (new) product by detecting the detecting member 252.

10. Variations of the Embodiments

Figure 23:
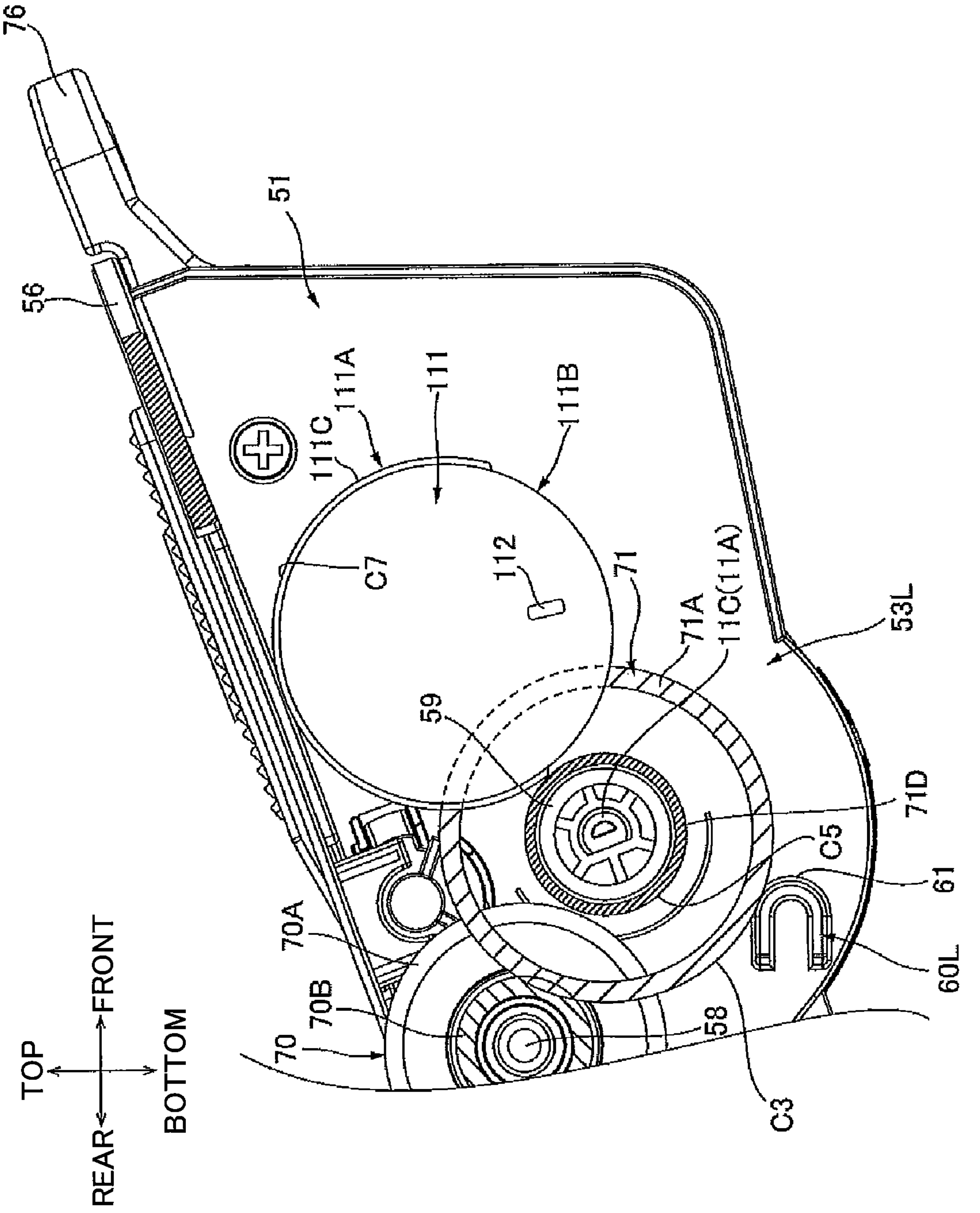
FIG. 23 is an example of an explanatory view illustrating a developing cartridge according to a variation of the second embodiment.

Next, a developing cartridge 3 according to a variation of the second embodiment will be described with reference to FIG. 23, wherein like parts and components described in the second embodiment are designated with the same reference numerals to avoid duplicating description.

The detected rotary body 101 according to the second embodiment described above has the toothed part 101A with gear teeth provided on its circumferential surface. However, in the variation of the second embodiment shown in FIG. 23, a detected rotary body 111 is configured as a friction rotary body having no gear teeth.

In this case, the detected rotary body 111 includes a contact part 111A, a non-contact part 111B, and a detection protrusion 112.

The contact part 111A occupies approximately two-thirds of a circumference of the detected rotary body 111, i.e., a region of the detected rotary body 111 equivalent to a sector shape in a side view having a central angle of approximately 240°. The contact part 111A has a rubber layer 111C formed over an entire circumferential surface of the contact part 111A. A circumferential portion C7 of the contact part 111A is spaced apart from the protrusion 60L. In other words, the protrusion 60L is positioned outside the circumferential portion C7 of the contact part 111A.

The non-contact part 111B occupies approximately the remaining one-third of the circumference of the detected rotary body 111, excluding the region occupied by the contact part 111A. The non-contact part 111B is a region of the detected rotary body 111 equivalent to a sector shape in a side view with a central angle of approximately 120°. The non-contact part 111B does not have a rubber layer.

The detection protrusion 112 is disposed at a position shifted radially outside of a center of the detected rotary body 111. The detection protrusion 112 has a square columnar shape that protrudes leftward from a left surface of the detected rotary body 111.

When a developing cartridge 3 in an unused (new) state is mounted to the apparatus body 82 of the image forming apparatus 81, the rubber layer 111C of the contact part 111A contacts the second gear part 71D of the agitator gear 71 and, the contact causes the detected rotary body 111 to rotate for a prescribed duration. The detected rotary body 111 stops rotating when the contact part 111A does not contact the second gear part 71D of the agitator gear 71.

In this variation, the detected rotary body 111 is an example of a friction gear. The circumferential portion C7 of the contact part 111A of the detected rotary body 111 is an example of an addendum circle for the friction gear.

The variation of the second embodiment can obtain the same advantageous effects described above for the second embodiment.

Figure 24:
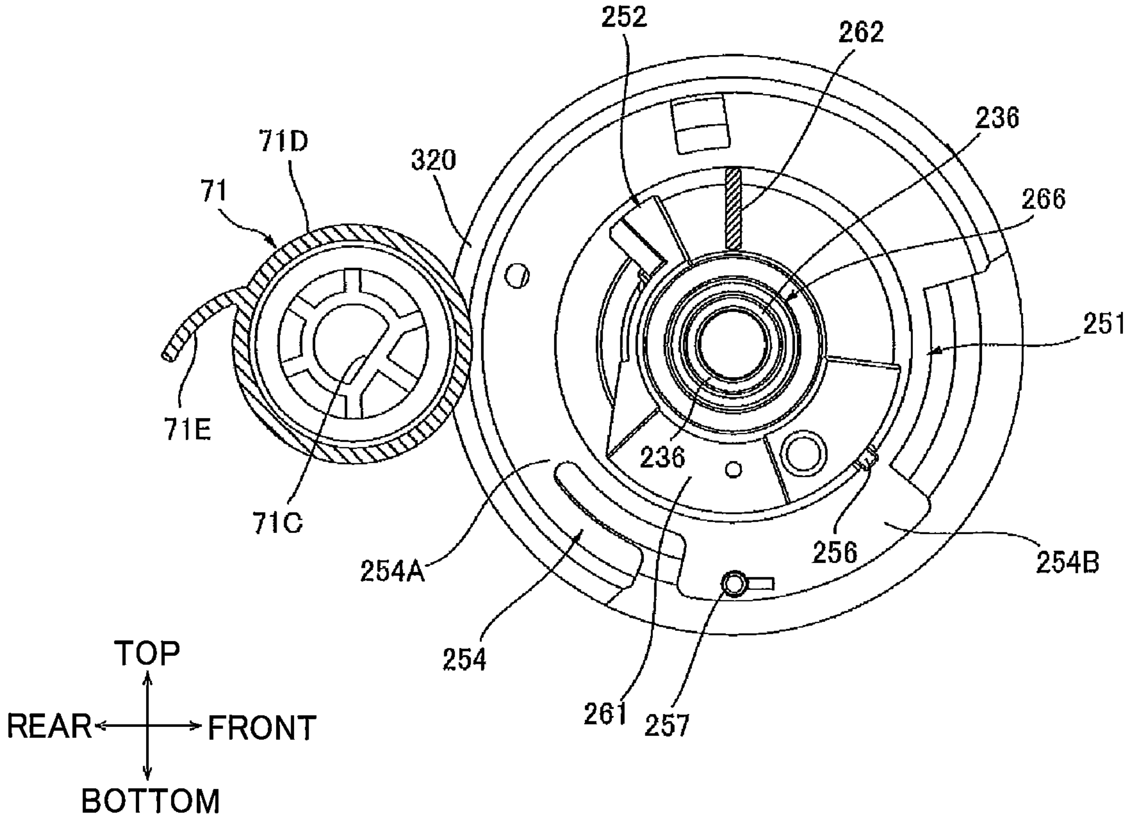
FIG. 24 is an example of an explanatory view illustrating a developing cartridge according to a variation of the third embodiment.

Next, a developing cartridge 3 according to a variation of the third embodiment will be described with reference to FIG. 24, wherein like parts and components described in the third embodiment are designated with the same reference numerals to avoid duplicating description.

In the variation of the third embodiment, the partially toothless gear 251 may be a gear that rotates when driven through contact, such as a meshing with another gear. For example, the partially toothless gear 251 may be a rotary body without the gear teeth 258 or a friction wheel having no gear teeth. More specifically, the partially toothless gear 251 may be provided with a resistance-applying member 320 instead of the gear teeth 258. The resistance-applying member 320 is formed of a material having a relatively high coefficient of friction, such as a rubber, and is provided at least around the outer circumferential surface of the partially toothless gear 251. The second gear part 71D is positioned within a rotating circumference of the resistance-applying member 320. In this case, friction generated between the resistance-applying member 320 and the second gear part 71D transmits a drive force to the partially toothless gear 251 for rotating the partially toothless gear 251. It is not limited to particular material and shape of the resistance-applying member 320, provided that the resistance-applying member 320 generates sufficient friction with the second gear part 71D for rotating the partially toothless gear 251.

The variation of the third embodiment described above can obtain the same advantageous effects described for the third embodiment.

While the description has been made in detail with reference to the embodiments thereof, it would be apparent to those skilled in the art that various changes and modifications may be made therein without departing from the spirit of the above-described embodiments.

What is claimed is:

1. A developing cartridge comprising:

a developing roller rotatable about a first axis extending in a first direction;

a casing configured to accommodate a developer therein, the casing having a first outer surface and a second outer surface spaced apart from the first outer surface in the first direction;

a coupling rotatable about a second axis extending in the first direction, the coupling being positioned at the first outer surface, the coupling including a coupling gear;

an idle gear including a large-diameter gear and a small-diameter gear, the idle gear being positioned at the first outer surface, a diameter of the small-diameter gear being smaller than a diameter of the large-diameter gear, the large-diameter gear being positioned between the first outer surface and the small-diameter gear in the first direction, the large-diameter gear meshing with the coupling gear;

an agitator rotatable about an agitator axis extending in the first direction;

an agitator gear mounted to the agitator and rotatable with the agitator about the agitator axis, the agitator gear being positioned at the first outer surface, the agitator gear including a first gear part and a second gear part positioned between the first outer surface and the first gear part in the first direction, a first diameter of the first gear part being larger than a second diameter of the second gear part, the first gear part meshing with the small-diameter gear;

a partially toothless gear including gear teeth and a toothless part, the gear teeth meshing with the second gear part of the agitator gear, the partially toothless gear being rotatable about a partially toothless gear axis extending in the first direction, the partially toothless gear being positioned at the first outer surface.

2. The developing cartridge according to claim 1, wherein the gear teeth are positioned at a circumferential portion of the partially toothless gear.

3. The developing cartridge according to claim 1, further comprising:

a cam movable in the first direction, wherein the partially toothless gear further includes:

a rib extending in the first direction, and wherein the cam moves in the first direction in a state where the cam is in contact with the rib in a case where the partially toothless gear rotates.

4. The developing cartridge according to claim 3, wherein the partially toothless gear has one end face in the first direction, and wherein the rib is positioned at the one end face.

5. The developing cartridge according to claim 4, wherein the partially toothless gear has another end face in the first direction, the another end face facing the first outer surface, and wherein the one end face is opposite to the another end face in the first direction.

6. The developing cartridge according to claim 5, further comprising:

a coil spring urging the cam toward the one end face of the partially toothless gear in the first direction.

7. The developing cartridge according to claim 4, further comprising:

a coil spring urging the cam toward the one end face of the partially toothless gear in the first direction.

8. The developing cartridge according to claim 3, further comprising:

a coil spring urging the cam in the first direction.

9. The developing cartridge according to claim 6, wherein the coil spring is positioned farther from the first outer surface than the partially toothless gear is from the first outer surface.

10. The developing cartridge according to claim 3, wherein the cam has a sloped surface.

11. The developing cartridge according to claim 9, further comprising:

a detection protrusion, wherein the sloped surface is positioned at one end of the cam in the first direction, and wherein the detection protrusion is positioned at another end of the cam in the first direction.

12. The developing cartridge according to claim 1, wherein the second gear part is positioned between the developing roller and the gear teeth in a second direction crossing the first direction.

13. The developing cartridge according to claim 1, further comprising:

a developing-roller gear positioned at the first outer surface, the developing-roller gear being mounted to the developing roller and rotatable with the developing roller;

a supply roller extending in the first direction; and a supply-roller gear positioned at the first outer surface, the supply-roller gear being mounted to the supply roller and rotatable with the supply roller, wherein the coupling gear is meshed with the developing-roller gear and the supply-roller gear.

14. The developing cartridge according to claim 1, wherein the casing has one end portion and another end portion spaced apart from the one end portion in a second direction crossing the first direction, the developing roller being positioned at the one end portion.

15. The developing cartridge according to claim 1, further comprising:

a protrusion extending in the first direction, the protrusion being positioned at the first outer surface, a part of the protrusion being positioned between the first outer surface and the first gear part of the agitator in the first direction.

16. The developing cartridge according to claim 15, wherein the protrusion is positioned closer to the developing roller than the second gear part of the agitator is to the developing roller in a second direction crossing the first direction.

* * * * *